(12) United States Patent
Holz

(10) Patent No.: US 10,817,130 B2
(45) Date of Patent: *Oct. 27, 2020

(54) DYNAMIC USER INTERACTIONS FOR DISPLAY CONTROL AND MEASURING DEGREE OF COMPLETENESS OF USER GESTURES

(71) Applicant: Ultrahaptics IP Two Limited, Bristol (GB)

(72) Inventor: David S. Holz, San Francisco, CA (US)

(73) Assignee: Ultrahaptics IP Two Limited, Bristol (GB)

( * ) Notice: Subject to any disclaimer, the term of this patent is extended or adjusted under 35 U.S.C. 154(b) by 19 days.

This patent is subject to a terminal disclaimer.

(21) Appl. No.: 16/055,010

(22) Filed: Aug. 3, 2018

(65) Prior Publication Data

US 2019/0073112 A1    Mar. 7, 2019

Related U.S. Application Data

(63) Continuation of application No. 14/156,424, filed on Jan. 15, 2014, now Pat. No. 10,042,510.
(Continued)

(51) Int. Cl.
*G06F 3/0481* (2013.01)
*G06K 9/00* (2006.01)
(Continued)

(52) U.S. Cl.
CPC .......... *G06F 3/04815* (2013.01); *G06F 3/017* (2013.01); *G06F 3/0346* (2013.01);
(Continued)

(58) Field of Classification Search
None
See application file for complete search history.

(56) References Cited

U.S. PATENT DOCUMENTS 5,134,661 A   7/1992 Reinsch
5,454,043 A   9/1995 Freeman
(Continued)

FOREIGN PATENT DOCUMENTS

CN   101930286 A   12/2010
CN   102117117 A   7/2011
(Continued)

OTHER PUBLICATIONS

PCT/US2014/011737—International Preliminary Report on Patentability dated Jul. 21, 2016, 14 pages.
(Continued)

*Primary Examiner* — Tuan S Nguyen
(74) *Attorney, Agent, or Firm* — Haynes Beffel & Wolfeld LLP; Paul A. Durdik; Andrew L. Dunlap

(57) ABSTRACT

The technology disclosed relates to distinguishing meaningful gestures from proximate non-meaningful gestures in a three-dimensional (3D) sensory space. In particular, it relates to calculating spatial trajectories of different gestures and determining a dominant gesture based on magnitudes of the spatial trajectories. The technology disclosed also relates to uniformly responding to gestural inputs from a user irrespective of a position of the user. In particular, it relates to automatically adapting a responsiveness scale between gestures in a physical space and resulting responses in a gestural interface by automatically proportioning on-screen responsiveness to scaled movement distances of gestures in the physical space, user spacing with the 3D sensory space, or virtual object density in the gestural interface. The technology disclosed further relates to detecting if a user has intended to interact with a virtual object based on measuring a degree of completion of gestures and creating interface elements in the 3D space.

15 Claims, 11 Drawing Sheets

Related U.S. Application Data

(60) Provisional application No. 61/791,204, filed on Mar. 15, 2013, provisional application No. 61/752,733, filed on Jan. 15, 2013, provisional application No. 61/752,725, filed on Jan. 15, 2013, provisional application No. 61/752,731, filed on Jan. 15, 2013.

(51) Int. Cl.
*G06F 3/01* (2006.01)
*G06F 3/0484* (2013.01)
*G06F 3/0485* (2013.01)
*G06F 3/0346* (2013.01)

(52) U.S. Cl.
CPC ........ *G06F 3/0485* (2013.01); *G06F 3/04817* (2013.01); *G06F 3/04847* (2013.01); *G06K 9/00355* (2013.01); *G06K 9/00201* (2013.01)

(56) References Cited

U.S. PATENT DOCUMENTS

| | | |
|---|---|---|
| 5,581,276 A | 12/1996 | Cipolla et al. |
| 5,594,469 A | 1/1997 | Freeman et al. |
| 5,742,263 A | 4/1998 | Wang et al. |
| 5,900,863 A | 5/1999 | Numazaki |
| 6,002,808 A | 12/1999 | Freeman |
| 6,075,892 A | 6/2000 | Fan et al. |
| 6,075,895 A | 6/2000 | Qiao et al. |
| 6,147,678 A | 11/2000 | Kumar et al. |
| 6,154,558 A | 11/2000 | Hsieh |
| 6,181,343 B1 | 1/2001 | Lyons |
| 6,195,104 B1 | 2/2001 | Lyons |
| 6,204,852 B1 | 3/2001 | Kumar et al. |
| 6,252,598 B1 | 6/2001 | Segen |
| 6,417,866 B1 | 7/2002 | Man et al. |
| 6,493,041 B1 | 12/2002 | Hanko et al. |
| 6,603,867 B1 | 8/2003 | Sugino et al. |
| 6,702,494 B2 | 3/2004 | Dumler et al. |
| 6,798,628 B1 | 9/2004 | Macbeth |
| 6,804,656 B1 | 10/2004 | Rosenfeld et al. |
| 6,950,534 B2 | 9/2005 | Cohen et al. |
| 6,993,157 B1 | 1/2006 | Oue et al. |
| 7,308,112 B2 | 12/2007 | Fujimura et al. |
| 7,340,077 B2 | 3/2008 | Gokturk et al. |
| 7,519,223 B2 | 4/2009 | Dehlin et al. |
| 7,542,586 B2 | 6/2009 | Johnson |
| 7,598,942 B2 | 10/2009 | Underkoffler et al. |
| 7,646,372 B2 | 1/2010 | Marks et al. |
| 7,665,041 B2 | 2/2010 | Wilson et al. |
| 7,831,932 B2 | 11/2010 | Josephsoon et al. |
| 7,840,031 B2 | 11/2010 | Albertson et al. |
| 7,861,188 B2 | 12/2010 | Josephsoon et al. |
| 7,886,229 B2 | 2/2011 | Pachet |
| 7,971,156 B2 | 6/2011 | Albertson et al. |
| 8,086,971 B2 | 12/2011 | Radivojevic et al. |
| 8,111,239 B2 | 2/2012 | Pryor et al. |
| 8,112,719 B2 | 2/2012 | Hsu et al. |
| 8,244,233 B2 | 8/2012 | Chang et al. |
| 8,514,221 B2 | 8/2013 | King et al. |
| 8,854,433 B1 | 10/2014 | Rafii |
| 8,872,914 B2 | 10/2014 | Gobush |
| 8,930,852 B2 | 1/2015 | Chen et al. |
| 9,056,396 B1 | 6/2015 | Linnell |
| 9,389,779 B2 | 7/2016 | Anderson et al. |
| 9,436,288 B2 | 9/2016 | Holz |
| 2004/0046736 A1 | 3/2004 | Pryor et al. |
| 2005/0131607 A1 | 6/2005 | Breed |
| 2005/0168578 A1 | 8/2005 | Gobush |
| 2007/0236475 A1 | 10/2007 | Wherry |
| 2008/0113756 A1 | 5/2008 | Williams et al. |
| 2008/0141181 A1* | 6/2008 | Ishigaki ............... G06F 3/011 715/863 |
| 2008/0278589 A1 | 11/2008 | Thorn |
| 2009/0102840 A1 | 4/2009 | Li |
| 2009/0122146 A1 | 5/2009 | Zalewski et al. |
| 2009/0184920 A1 | 7/2009 | Francis |
| 2009/0217211 A1 | 8/2009 | Hildreth et al. |
| 2009/0257623 A1 | 10/2009 | Tang et al. |
| 2009/0274339 A9 | 11/2009 | Cohen et al. |
| 2009/0309710 A1 | 12/2009 | Kakinami |
| 2010/0027845 A1 | 2/2010 | Kim et al. |
| 2010/0046842 A1 | 2/2010 | Conwell |
| 2010/0053164 A1 | 3/2010 | Imai et al. |
| 2010/0058252 A1 | 3/2010 | Ko |
| 2010/0118123 A1 | 5/2010 | Freedman et al. |
| 2010/0125815 A1 | 5/2010 | Wang et al. |
| 2010/0156676 A1 | 6/2010 | Mooring et al. |
| 2010/0201880 A1 | 8/2010 | Iwamura |
| 2010/0219934 A1 | 9/2010 | Matsumoto |
| 2010/0222102 A1 | 9/2010 | Rodriguez |
| 2010/0231512 A1 | 9/2010 | Perez et al. |
| 2010/0277411 A1 | 11/2010 | Yee et al. |
| 2010/0278393 A1 | 11/2010 | Snook et al. |
| 2010/0283739 A1 | 11/2010 | Zhang et al. |
| 2010/0302357 A1 | 12/2010 | Hsu et al. |
| 2010/0306712 A1 | 12/2010 | Snook et al. |
| 2010/0306713 A1 | 12/2010 | Geisner et al. |
| 2010/0309097 A1 | 12/2010 | Raviv et al. |
| 2011/0007072 A1 | 1/2011 | Khan et al. |
| 2011/0026765 A1 | 2/2011 | Ivanich et al. |
| 2011/0035666 A1 | 2/2011 | Geisner et al. |
| 2011/0057875 A1 | 3/2011 | Shigeta et al. |
| 2011/0080470 A1 | 4/2011 | Kuno et al. |
| 2011/0093820 A1 | 4/2011 | Zhang et al. |
| 2011/0107216 A1 | 5/2011 | Bi |
| 2011/0134112 A1 | 6/2011 | Koh et al. |
| 2011/0169726 A1 | 7/2011 | Holmdahl et al. |
| 2011/0173235 A1 | 7/2011 | Aman et al. |
| 2011/0173574 A1 | 7/2011 | Clavin et al. |
| 2011/0181509 A1 | 7/2011 | Rautiainen et al. |
| 2011/0193939 A1 | 8/2011 | Vassigh et al. |
| 2011/0205151 A1 | 8/2011 | Newton et al. |
| 2011/0213664 A1 | 9/2011 | Osterhout et al. |
| 2011/0234840 A1 | 9/2011 | Klefenz et al. |
| 2011/0267259 A1 | 11/2011 | Tidemand et al. |
| 2011/0286676 A1 | 11/2011 | El Dokor |
| 2011/0289455 A1 | 11/2011 | Reville et al. |
| 2011/0289456 A1 | 11/2011 | Reville et al. |
| 2011/0291925 A1 | 12/2011 | Israel et al. |
| 2011/0291988 A1 | 12/2011 | Bamji et al. |
| 2011/0296353 A1 | 12/2011 | Ahmed et al. |
| 2011/0299737 A1 | 12/2011 | Wang et al. |
| 2011/0304650 A1 | 12/2011 | Campillo et al. |
| 2011/0310007 A1 | 12/2011 | Margolis et al. |
| 2011/0314427 A1 | 12/2011 | Sundararajan |
| 2012/0001938 A1 | 1/2012 | Sandberg |
| 2012/0038637 A1 | 2/2012 | Marks |
| 2012/0050157 A1 | 3/2012 | Latta et al. |
| 2012/0053015 A1 | 3/2012 | Esaki et al. |
| 2012/0062489 A1 | 3/2012 | Andersson et al. |
| 2012/0065499 A1 | 3/2012 | Chono |
| 2012/0068914 A1 | 3/2012 | Jacobsen et al. |
| 2012/0105613 A1 | 5/2012 | Weng et al. |
| 2012/0127070 A1 | 5/2012 | Ryoo et al. |
| 2012/0150650 A1 | 6/2012 | Zahand |
| 2012/0151421 A1* | 6/2012 | Clarkson ............... G06F 3/017 715/863 |
| 2012/0157203 A1 | 6/2012 | Latta et al. |
| 2012/0167134 A1 | 6/2012 | Hendricks et al. |
| 2012/0223959 A1 | 9/2012 | Lengeling |
| 2012/0268410 A1 | 10/2012 | King et al. |
| 2013/0019204 A1 | 1/2013 | Kotler et al. |
| 2013/0055120 A1* | 2/2013 | Galor ..................... G06F 3/017 715/764 |
| 2013/0167092 A1 | 6/2013 | Yu et al. |
| 2013/0194238 A1 | 8/2013 | Sakai |
| 2014/0113507 A1 | 4/2014 | Vanzetto |
| 2014/0118255 A1 | 5/2014 | Billerbeck |
| 2014/0157209 A1 | 6/2014 | Dalal et al. |
| 2014/0201674 A1 | 7/2014 | Holz |
| 2014/0201683 A1 | 7/2014 | Holz |
| 2014/0201684 A1 | 7/2014 | Holz |
| 2014/0201690 A1 | 7/2014 | Holz |
| 2014/0247695 A1 | 9/2014 | Vangeel et al. |

(56) References Cited

U.S. PATENT DOCUMENTS

| | | |
|---|---|---|
| 2014/0258880 A1 | 9/2014 | Holm et al. |
| 2014/0304665 A1 | 10/2014 | Holz |
| 2014/0306903 A1 | 10/2014 | Huang et al. |
| 2015/0116214 A1 | 4/2015 | Grunnet-Jepsen et al. |

FOREIGN PATENT DOCUMENTS

| | | |
|---|---|---|
| CN | 102216883 A | 10/2011 |
| CN | 102262438 A | 11/2011 |
| CN | 102402290 A | 4/2012 |
| CN | 102439538 A | 5/2012 |
| CN | 105308536 A | 2/2016 |
| DE | 11 2014 000 441 T5 | 10/2015 |
| EP | 1477924 A2 | 11/2004 |
| EP | 2369443 A2 | 9/2011 |
| GB | 2419433 A | 4/2006 |
| WO | 2014113507 A1 | 7/2014 |

OTHER PUBLICATIONS

PCT/US2014/011737—International Search Report and Written Opinion dated May 30, 2014, 20 pages.
U.S. Appl. No. 14/156,418—Office Action dated Aug. 22, 2016, 11 pages.
U.S. Appl. No. 14/156,418—Response to Aug. 22, 2016 Office Action filed Nov. 22, 2016, 7 pages.
U.S. Appl. No. 14/156,424—Notice of Allowance dated Apr. 11, 2018, 13 pages.
U.S. Appl. No. 14/156,424—Office Action dated Oct. 11, 2017, 20 pages.
U.S. Appl. No. 14/156,424—Office Action dated Sep. 20, 2016, 32 pages.
U.S. Appl. No. 14/156,424—Office Action dated Jun. 28, 2017, 17 pages.
U.S. Appl. No. 14/156,424—Office Action dated Mar. 8, 2017, 21 pages.
U.S. Appl. No. 14/156,424—Response to Office Action dated Oct. 11, 2017 filed Jan. 4, 2018, 13 pages.
U.S. Appl. No. 14/156,424—Response to Office Action dated Sep. 20, 2016, filed Dec. 20, 2016, 10 pages.
U.S. Appl. No. 14/156,424—Response to Office Action dated Jun. 28, 2017 filed Sep. 7, 2017, 10 pages.
U.S. Appl. No. 14/156,424—Response to Office Action dated Mar. 8, 2017 filed May 31, 2017, 10 pages.
U.S. Appl. No. 14/156,424—Supplemental Response to Office Action dated Oct. 11, 2017 filed Mar. 8, 2018, 14 pages.
U.S. Appl. No. 14/156,424—Supplemental Response to Office Action dated Mar. 8, 2017 filed Jun. 9, 2017, 12 pages.
U.S. Appl. No. 15/491,752—Advisory Action dated Jan. 2, 2020, 3 pages.
U.S. Appl. No. 15/491,752—Final Office Action dated Oct. 9, 2019, 31 pages.
U.S. Appl. No. 15/491,752—Office Action dated Apr. 17, 2019, 60 pages.
U.S. Appl. No. 15/491,752—Response to Advisory Action dated Jan. 2, 2020 filed Jan. 15, 2020 w/RCE, 23 pages.
U.S. Appl. No. 15/491,752—Response to Final Office Action dated Oct. 9, 2019 filed Dec. 9, 2019, 15 pages.
U.S. Appl. No. 15/491,752—Response to Office Action dated Apr. 17, 2019, filed Aug. 19, 2019, 13 pages.
U.S. Appl. No. 14/156,426—Final Office Action dated Oct. 12, 2017, 19 pages.
U.S. Appl. No. 14/156,426—Office Action dated Sep. 19, 2016, 32 pages.
U.S. Appl. No. 14/156,426—Office Action dated Jun. 28, 2017, 13 pages.
U.S. Appl. No. 14/156,426—Office Action dated Mar. 9, 2017, 21 pages.
U.S. Appl. No. 14/156,426—Response to Final Office Action dated Oct. 12, 2017, filed Jan. 5, 2018, 12 pages.
U.S. Appl. No. 14/156,426—Response to Office Action dated Sep. 19, 2016 filed Dec. 19, 2016, 9 pages.
U.S. Appl. No. 14/156,426—Response to Office Action dated Jun. 28, 2017 filed Sep. 14, 2017, 8 pages.
U.S. Appl. No. 14/156,426—Response to Office Action dated Mar. 9, 2017, filed May 31, 2017, 9 pages.
U.S. Appl. No. 14/156,426—Supplemental Response to Office Action dated Oct. 12, 2017, filed Mar. 9, 2018, 14 pages.
U.S. Appl. No. 14/156,426—Supplemental Response to Office Action dated Mar. 9, 2017, filed Jun. 9, 2017, 11 pages.
U.S. Appl. No. 16/055,010—Notice of Allowance dated Mar. 4, 2020, 16 pages.
CN 201480014375.1—First Office Action dated Jul. 3, 2017, 7 pages.
CN 201480014375.1—Fourth Office Action (Rejection Decision) dated Jan. 25, 2019, 6 pages.
CN 201480014375.1—Response to First Office Action dated Jul. 3, 2017 filed Nov. 17, 2017, 9 pages.
CN 201480014375.1—Response to Second Office Action dated Jan. 17, 2018 filed Jun. 1, 2018, 17 pages.
CN 201480014375.1—Response to Third Office Action dated Aug. 20, 2018 filed Nov. 5, 2018, 5 pages.
CN 201480014375.1—Second Office Action dated Jan. 17, 2018, 15 pages.
CN 201480014375.1—Third Office Action dated Aug. 20, 2018, 15 pages.
U.S. Appl. No. 14/156,420—Notice of Allowance dated Mar. 7, 2017, 16 pages.
U.S. Appl. No. 14/156,420—Office Action dated Dec. 15, 2016, 36 pages.
U.S. Appl. No. 14/156,420—Office Action dated Aug. 24, 2016, 8 pages.
U.S. Appl. No. 14/156,420—Response to Aug. 24 Office Action filed Sep. 7, 2016, 12 pages.
U.S. Appl. No. 14/156,420—Response to Office Action dated Dec. 15, 2016 filed Feb. 15, 2017, 14 pages.
U.S. Appl. No. 14/156,429—Office Action dated Oct. 5, 2016, 45 pages.
U.S. Appl. No. 14/156,429—Office Action dated Sep. 24, 2018, 34 pages.
U.S. Appl. No. 14/156,429—Office Action dated Aug. 28, 2017, 36 pages.
U.S. Appl. No. 14/156,429—Office Action dated May 3, 2017, 22 pages.
U.S. Appl. No. 14/156,429—Office Action dated Feb. 7, 2018, 31 pages.
U.S. Appl. No. 14/156,429—Response to Office Action dated Sep. 24, 2018, filed Aug. 2, 2018, 17 pages.
U.S. Appl. No. 14/156,429—Response to Office Action dated Aug. 28, 2017 filed Nov. 28, 2017, 19 pages.
U.S. Appl. No. 15/491,752—Supplemental Response to Office Action filed May 29, 2020, 17 pages.
U.S. Appl. No. 15/491,752—Office Action dated Feb. 21, 2020, 24 pages.
U.S. Appl. No. 15/491,752—Response to Office Action dated Feb. 21, 2020 filed May 21, 2020, 27 pages.

* cited by examiner

DYNAMIC USER INTERACTIONS FOR DISPLAY CONTROL AND MEASURING DEGREE OF COMPLETENESS OF USER GESTURES

RELATED APPLICATION

This application is a continuation of U.S. patent application Ser. No. 14/156,424, entitled "DYNAMIC USER INTERACTIONS FOR DISPLAY CONTROL AND MEASURING DEGREE OF COMPLETENESS OF USER GESTURES", filed Jan. 15, 2014, which claims the benefit of four US provisional Patent Applications, including: No. 61/752,725, entitled, "DYNAMIC USER INTERACTIONS FOR DISPLAY CONTROL," filed 15 Jan. 2013; No. 61/752,731, entitled, "DYNAMIC USER INTERACTIONS FOR DISPLAY CONTROL," filed 15 Jan. 2013; No. 61/752,733, entitled, "DYNAMIC USER INTERACTIONS FOR DISPLAY CONTROL," filed 15 Jan. 2013; and No. 61/791,204, entitled, "DYNAMIC USER INTERACTIONS FOR DISPLAY CONTROL," filed 15 Mar. 2013. The provisional applications are hereby incorporated by reference for all purposes.

FIELD OF THE TECHNOLOGY DISCLOSED

The technology disclosed relates, in general, to display control, and in particular to display control based on dynamic user interactions.

BACKGROUND

Traditionally, users have interacted with electronic devices (such as a computer or a television) or computing applications (such as computer games, multimedia applications, or office applications) via indirect input devices, including, for example, keyboards, joysticks, or remote controllers. The user manipulates the input devices to perform a particular operation, such as selecting a specific entry from a menu of operations. Modern input devices, however, include multiple buttons, often in a complex configuration, to facilitate communication of user commands to the electronic devices or computing applications; correct operation of these input devices is often challenging to the user. Additionally, actions performed on an input device generally do not correspond in any intuitive sense to the resulting changes on, for example, a screen display controlled by the device. Input devices can also be lost, and the frequent experience of searching for misplaced devices has become a frustrating staple of modern life.

Touch screens implemented directly on user-controlled devices have obviated the need for separate input devices. A touch screen detects the presence and location of a "touch" performed by a user's finger or other object on the display screen, enabling the user to enter a desired input by simply touching the proper area of a screen. While suitable for small display devices such as tablets and wireless phones, touch screens are impractical for large entertainment devices that the user views from a distance. Particularly for games implemented on such devices, electronics manufacturers have developed systems that detect a user's movements or gestures and cause the display to respond in a narrow context. For example, a user near a TV may perform a sliding hand gesture, which is detected by the gesture-recognition system, in response to the detected gesture, the TV may activate and display a control panel on the screen, allowing the user to make selections thereon using subsequent gestures, for example, the user may move her hand in an "up" or "down" direction, which, again, is detected and interpreted to facilitate channel selection.

While these systems have generated substantial consumer excitement and may ultimately supplant conventional control modalities that require physical contact between the user and a control element, current devices suffer from low detection sensitivity. The user is required to perform broad, often exaggerated and sometimes awkward movements in order to elicit a response from the gesture-recognition system. Small gestures are either undetectable or treated like noise due to the low resolution. For example, to move a cursor on the TV by a distance of one centimeter, the user's hand may have to traverse a much larger distance. This mismatch not only imposes a cumbersome operational burden on the user—particularly when there are movement constraints—but, once again, degrades the intuitive relationship between gesture and response. Moreover, the response of the system is often unitary, i.e., the physical span of a gesture always corresponds to the same on-screen control increment, regardless of user preference.

Consequently, an opportunity arises to introduce a new gesture-recognition system that detects small gestures in real time and allows users to adjust the relationship between physical movements and the corresponding actions displayed on the screen.

To select a desired virtual object displayed on the screen of the electronic device, the user may be required to sweep her hand over a large distance. Sweeping over too short a distance may be either undetectable or treated as noise due to low sensitivity, thereby causing the desired virtual object to remain unselected. As a result, the user may find herself performing the same hand gesture repetitively, with various degrees of movement, until the desired selection is acknowledged. The repetitive performance of a gesture is not only annoying but makes it difficult for the user to determine exactly when the virtual object is successfully selected. Accordingly, there is a need for a gesture-recognition system that indicates completion of the user's gesture.

Furthermore, a user action intended as a single gesture may nonetheless involve interrelated movements that can each be interpreted as a separate gesture. As a result, a conventional gesture-recognition system may not properly interpret the user's intent, and therefore convey faulty signals (or no signal at all) to a controlled electronic device. Suppose, for example, that the user waves her arm while unconsciously flexing her fingers; the gesture-recognition system may be unable to discern the intended gesture due to the interrelated movement, or may signal performance of two gestures (which may conflict, overwhelm the controlled device, or one of the gestures may fail to correspond to allowable input).

Existing systems, however, rely on input elements (e.g., computer mice and keyboards) to supplement any gesture-recognition they may perform. These systems lack the user-interface elements required for anything more than simple commands, and often, recognize these commands only after the user has set up a gesture-recognition environment via a keyboard and mouse. Therefore, a further opportunity arises to introduce a new gesture-recognition system that allows users to interact with a wider variety of applications and games in a more sophisticated manner.

SUMMARY

Implementations of the technology disclosed relate to methods and systems having high detection sensitivity for the user's gestures to allow the user to accurately and quickly (i.e., without any unnecessary delay time) control an electronic device using small gestures and, in some implementations, to control the relationship between the physical span of a gesture and the resulting displayed response. In various implementations, the shapes and positions of one or more body parts of the user performing the gestures (hereafter collectively referred to as "gesturers," e.g., fingers, hands, arms, etc.) are first detected and identified in captured two-dimensional (2D) images; a temporal collection of the gesturers in a set of time-sequenced images is then assembled to reconstruct the performed gestures in three-dimensional (3D) space. The user's intent may be identified by, for example, comparing the detected gesture against a set of gesture records stored in a database. Each gesture record relates a detected gesture (coded, for example, as a vector) to an action, command or other input, which is processed by the currently running application—e.g., to invoke a corresponding instruction or instruction sequence, which is thereupon executed, or to provide a parameter value or other input data. Because the gesture-recognition system in the technology disclosed provides high detection sensitivity, small movements (e.g., a motion of a few millimeters) of the body's part (e.g., a finger) can be accurately detected and recognized, thereby allowing the user to accurately interact with the electronic device and/or the applications displayed thereon.

Some implementations of the technology disclosed discern, in real time, a dominant gesture from unrelated movements that may each qualify as a gesture, and may output a signal indicative of the dominant gesture. Methods and systems in accordance with the technology disclosed desirably have high detection sensitivity for movements that may qualify as user gestures, and this capability, when coupled with rapid discernment of a dominant gesture, allow the user to accurately and quickly (i.e., without any unnecessary delay time) control an electronic device.

In various implementations, the gesture-recognition system identifies a user's dominant gesture when more than one gesture (e.g., an arm waving gesture and finger flexing) is detected. For example, the gesture-recognition system may computationally represent the waving gesture as a waving trajectory and the finger flexing gestures as five separate (and smaller) trajectories. Each trajectory may be converted into a vector along, for example, six Euler degrees of freedom in Euler space. The vector with the largest magnitude represents the dominant component of the motion (e.g., waving in this case) and the rest of vectors may be ignored or processed differently than the dominant gesture. In some implementations, a vector filter that can be implemented using filtering techniques is applied to the multiple vectors to filter out the small vectors and identify the dominant vector. This process may be repetitive, iterating until one vector—the dominant component of the motion—is identified. The identified dominant component can then be used to manipulate the electronic device or the applications thereof.

In some implementations, the gesture-recognition system enables or provides an on-screen indicator showing in real time the degree of gesture completion. For example, the gesture-recognition system may recognize the gesture by matching it to a database record that includes multiple images, each of which is associated with a degree (e.g., from 1% to 100%) of completion of the performed gesture. The degree of completion of the performed gesture is then rendered on the screen. For example, as the user moves her finger closer to an electronic device to perform a clicking or touching gesture, the device display may show a hollow circular icon that a rendering application gradually fills in with a color indicating how close the user's motion is to completing the gesture. When the user fully performs the clicking or touching gesture, the circle is entirely filled in; this may result in, for example, labeling the desired virtual object as a chosen object. The degree-of-completion indicator thus enables the user to recognize the exact moment when the virtual object is selected.

In other implementations, a virtual on-screen puck may be used to select a value of a variable or other parameter by allowing a user to slide the puck by pushing on its side. The user may create other user-interface elements by making further gestures and, once the elements are created, use them as inputs or controls to software applications.

In one implementation, the gesture-recognition system provides functionality for the user to statically or dynamically adjust the relationship between her actual motion and the resulting response, e.g., object movement displayed on the electronic device's screen. In static operation, the user manually sets this sensitivity level by manipulating a displayed slide switch or other icon using, for example, the gesture-recognition system described herein. In dynamic operation, the system automatically responds to the distance between the user and the device, the nature of the activity being displayed, the available physical space, and/or the user's own pattern of response (e.g., scaling the response based on the volume of space in which the user's gestures appear to be confined). For example, when limited space is available, the user may adjust the relationship to a ratio smaller than one (e.g., 1:10), such that each unit (e.g., one millimeter) of her actual movement results in ten units (e.g., 10 pixels or 10 millimeters) of object movement displayed on the screen. Similarly, when the user is relatively close to the electronic device, she may adjust (or the device, sensing the user's distance, may autonomously adjust) the relationship to a ratio larger than one (e.g., 10:1) to compensate. Accordingly, adjusting the ratio of the user's actual motion to the resulting action (e.g., object movement) displayed on the screen provides extra flexibility for the user to remotely command the electric device and/or control the virtual environment displayed thereon.

Other aspects and advantages of the present technology can be seen on review of the drawings, the detailed description and the claims, which follow.

BRIEF DESCRIPTION OF THE DRAWINGS

In the drawings, like reference characters generally refer to the like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Implementations of the technology disclosed relate to methods and systems operating a motion-capture system with reduced power consumption using audio signals. For example, a sequence of images can be correlated to construct a 3-D model of the object, including its position and shape. A succession of images can be analyzed using the same technique to model motion of the object such as free-form gestures. In low-light situations, where free-form gestures cannot be recognized optically with a sufficient degree of reliability, audio signals can supply the direction and location of the object as further described herein.

As used herein, a given signal, event or value is "dependent on" a predecessor signal, event or value if the predecessor signal, event or value influenced the given signal, event or value. If there is an intervening processing element, step or time period, the given signal, event or value can still be "dependent on" the predecessor signal, event or value. If the intervening processing element or step combines more than one signal, event or value, the signal output of the processing element or step is considered "dependent on" to each of the signal, event or value inputs. If the given signal, event or value is the same as the predecessor signal, event or value, this is merely a degenerate case in which the given signal, event or value is still considered to be "dependent on" the predecessor signal, event or value. "Responsiveness" of a given signal, event or value upon another signal, event or value is defined similarly.

Figure 1A:
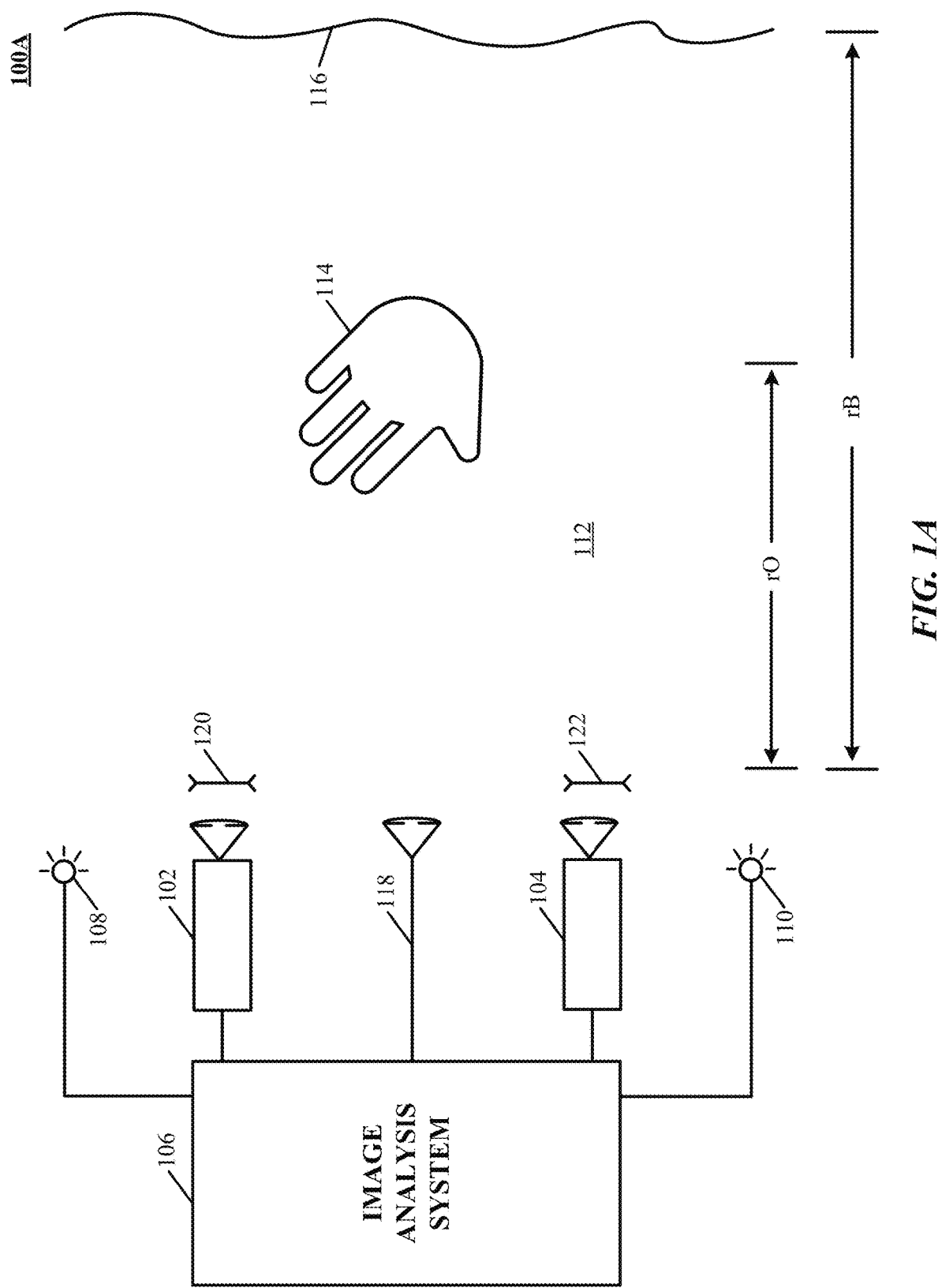
FIG. 1A illustrates a system for capturing image data according to an implementation of the technology disclosed.

Referring first to FIG. 1A, which illustrates an exemplary gesture-recognition system 100A including a pair of cameras 102, 104 coupled to an image-analysis system 106. Cameras 102, 104 can be any type of camera, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. While illustrated using an example two camera implementation, other implementations are readily achievable using different numbers of cameras or non-camera light sensitive image sensors or combinations thereof. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 102, 104 are preferably capable of capturing video images (i.e., successive image frames at a constant rate of at least 15 frames per second), although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter on a side.

In some implementations, the illustrated system 100A includes a pair of sources 108, 110, which can be disposed to either side of cameras 102, 104, and are controlled by image-analysis system 106. In one implementation, the sources 108, 110 are light sources. For example, the light sources can be infrared light sources, e.g., infrared light-emitting diodes (LEDs), and cameras 102, 104 can be sensitive to infrared light. Use of infrared light can allow the gesture-recognition system 100A to operate under a broad range of lighting conditions and can avoid various inconveniences or distractions that may be associated with directing visible light into the region where the person is moving. However, a particular wavelength or region of the electromagnetic spectrum is required. In one implementation, filters 120, 122 are placed in front of cameras 102, 104 to filter out visible light so that only infrared light is registered in the images captured by cameras 102, 104. In another implementation, the sources 108, 110 are sonic sources. The sonic sources transmit sound waves to the user; the user either blocks (or "sonic shadowing") or alters the sound waves (or "sonic deflections") that impinge upon her. Such sonic shadows and/or deflections can also be used to detect the user's gestures. In some implementations, the sound waves are, for example, ultrasound, that is not audible to humans.

It should be stressed that the arrangement shown in FIG. 1A is representative and not limiting. For example, lasers or other light sources can be used instead of LEDs. In implementations that include laser(s), additional optics (e.g., a lens or diffuser) may be employed to widen the laser beam (and make its field of view similar to that of the cameras). Useful arrangements can also include short- and wide-angle illuminators for different ranges. Light sources are typically diffuse rather than specular point sources; for example, packaged LEDs with light-spreading encapsulation are suitable.

In operation, light sources 108, 110 are arranged to illuminate a region of interest 112 that contains a part of a human body 114 (in this example, a hand) that optionally holds a tool or other object of interest, cameras 102, 104 are oriented toward the region 112 to capture video images of the hand 114. In some implementations, the operation of light sources 108, 110 and cameras 102, 104 is controlled by the image-analysis system 106, which can be, e.g., a computer system. Based on the captured images, image-analysis system 106 determines the position and/or motion of object 114.

Figure 1B:
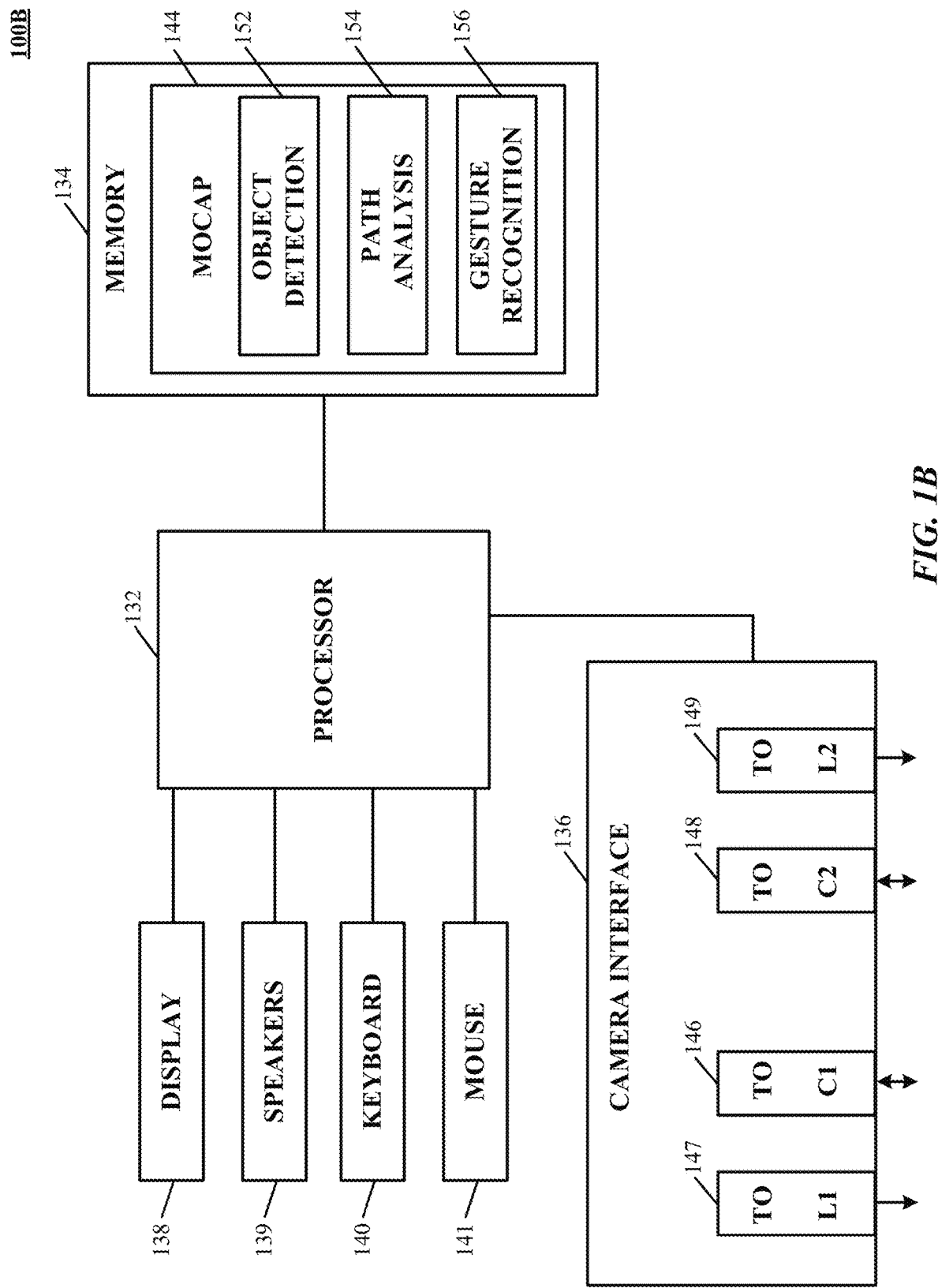
FIG. 1B is a simplified block diagram of a gesture-recognition system implementing an image analysis apparatus according to an implementation of the technology disclosed.

FIG. 1B is a simplified block diagram of a computer system 100B, implementing image-analysis system 106 (also referred to as an image analyzer) according to an implementation of the technology disclosed. Image-analysis system 106 can include or consist of any device or device component that is capable of capturing and processing image data. In some implementations, computer system 100B includes a processor 132, a memory 134, a camera interface 136, a display 138, speakers 139, a keyboard 140, and a mouse 141. Memory 134 can be used to store instructions to be executed by processor 132 as well as input and/or output data associated with execution of the instructions. In particular, memory 134 contains instructions, conceptually illustrated as a group of modules described in greater detail below, that control the operation of processor 132 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENACTION operating system, iOS, Android or other mobile operating systems, or another operating system of platform.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 132 may be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Camera interface 136 can include hardware and/or software that enables communication between computer system 100B and cameras such as cameras 102, 104 shown in FIG. 1A, as well as associated light sources such as light sources 108, 110 of FIG. 1A. Thus, for example, camera interface 136 can include one or more data ports 146, 148 to which cameras can be connected, as well as hardware and/or software signal processors to modify data signals received from the cameras (e.g., to reduce noise or reformat data) prior to providing the signals as inputs to a motion-capture ("mocap") program 144 executing on processor 132. In some implementations, camera interface 136 can also transmit signals to the cameras, e.g., to activate or deactivate the cameras, to control camera settings (frame rate, image quality, sensitivity, etc.), or the like. Such signals can be transmitted, e.g., in response to control signals from processor 132, which may in turn be generated in response to user input or other detected events.

Camera interface 136 can also include controllers 147, 149, to which light sources (e.g., light sources 108, 110) can be connected. In some implementations, controllers 147, 149 supply operating current to the light sources, e.g., in response to instructions from processor 132 executing mocap program 144. In other implementations, the light sources can draw operating current from an external power supply (not shown), and controllers 147, 149 can generate control signals for the light sources, e.g., instructing the light sources to be turned on or off or changing the brightness. In some implementations, a single controller can be used to control multiple light sources.

Instructions defining mocap program 144 are stored in memory 134, and these instructions, when executed, perform motion-capture analysis on images supplied from cameras connected to camera interface 136. In one implementation, mocap program 144 includes various modules, such as an object detection module 152, an object analysis module 154, and a gesture-recognition module 156. Object detection module 152 can analyze images (e.g., images captured via camera interface 136) to detect edges of an object therein and/or other information about the object's location. Object analysis module 154 can analyze the object information provided by object detection module 152 to determine the 3D position and/or motion of the object (e.g., a user's hand). Examples of operations that can be implemented in code modules of mocap program 144 are described below. Memory 134 can also include other information and/or code modules used by mocap program 144.

Display 138, speakers 139, keyboard 140, and mouse 141 can be used to facilitate user interaction with computer system 100B. In some implementations, results of gesture capture using camera interface 136 and mocap program 144 can be interpreted as user input. For example, a user can perform hand gestures that are analyzed using mocap program 144, and the results of this analysis can be interpreted as an instruction to some other program executing on processor 132 (e.g., a web browser, word processor, or other application). Thus, by way of illustration, a user might use upward or downward swiping gestures to "scroll" a webpage currently displayed on display 138, to use rotating gestures to increase or decrease the volume of audio output from speakers 139, and so on.

It will be appreciated that computer system 100B is illustrative and that variations and modifications are possible. Computer systems can be implemented in a variety of form factors, including server systems, desktop systems, laptop systems, tablets, smart phones or personal digital assistants, and so on. A particular implementation may include other functionality not described herein, e.g., wired and/or wireless network interfaces, media playing and/or recording capability, etc. In some implementations, one or more cameras may be built into the computer rather than being supplied as separate components. Further, an image analyzer can be implemented using only a subset of computer system components (e.g., as a processor executing program code, an ASIC, or a fixed-function digital signal processor, with suitable I/O interfaces to receive image data and output analysis results).

While computer system 100B is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

Figure 2A:
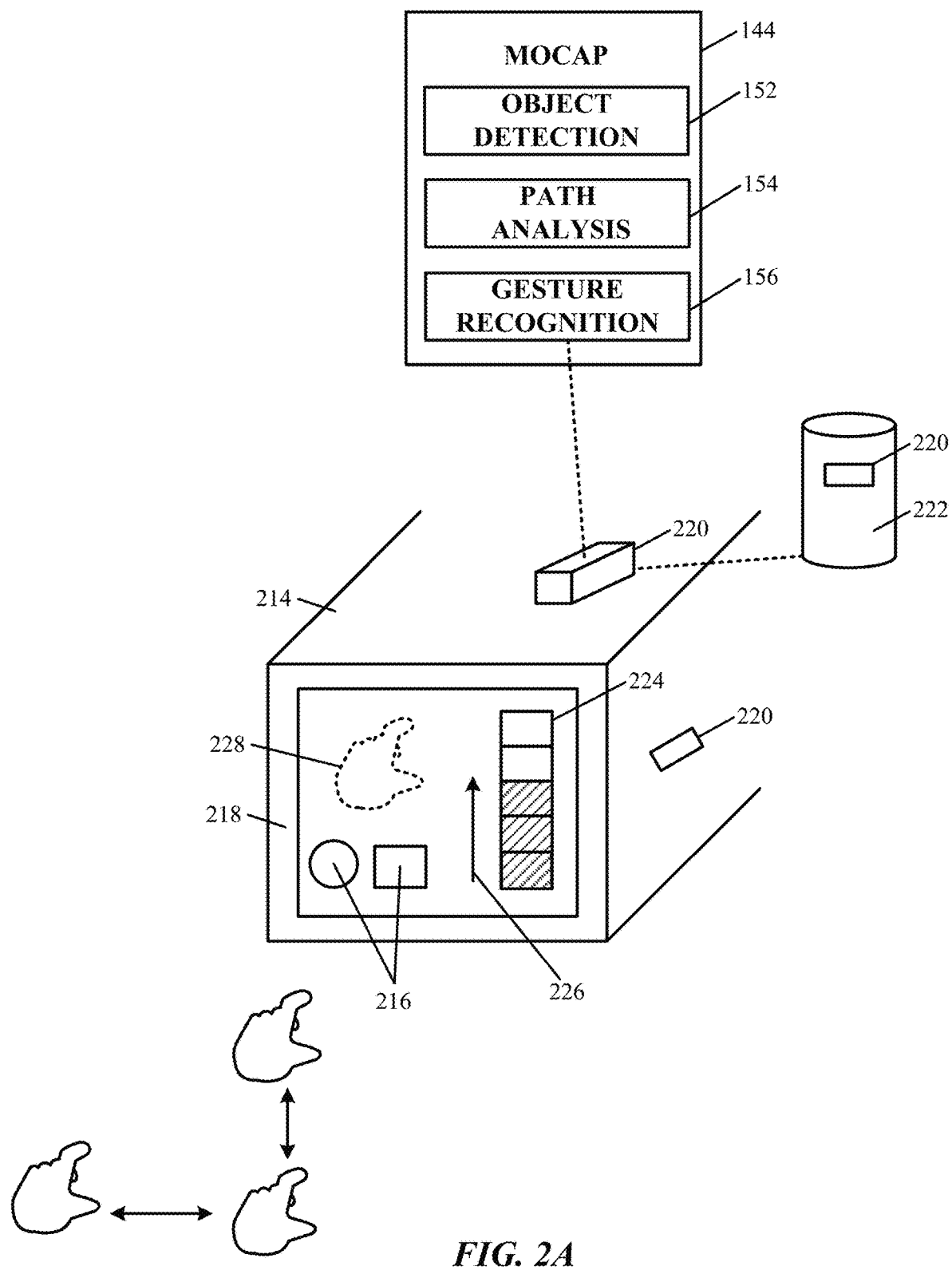
FIG. 2A depicts an electronic device controlled by a user's gestures in accordance with an implementation of the technology disclosed.

With reference to FIGS. 1A, 1B and 2A, the user performs a gesture that is captured by the cameras 102, 104 as a series of temporally sequential images. These are analyzed by a gesture-recognition module 156, which may be implemented as another module of the mocap 144. Gesture-recognition systems are well-known in the field of computer vision and may utilize algorithms based on 3D models (i.e., volumetric or skeletal models), simplified skeletal models that use a simplified representation of the human body or gesture-relevant body parts, or image-based models based on, for example, deformable templates of gesture-relevant body parts, or other techniques. See, e.g., Wu et al., "Vision-Based Gesture Recognition: A Review," in Gesture-Based Communication in Human-Computer Interaction (Springer 1999); Pavlovic et al., "Visual Interpretation of Hand Gestures for Human-Computer Interaction: A Review," IEEE Trans. Pattern Analysis and Machine Intelligence (19(7): 677-695, July 1997).

The gesture-recognition module 156 provides input to an electronic device 214, allowing a user to remotely control the electronic device 214 and/or manipulate virtual objects 216, such as prototypes/models, blocks, spheres, or other shapes, buttons, levers, or other controls, in a virtual environment displayed on the device's screen 218. The user may perform the gesture using any part of her body, such as a finger, a hand, or an arm. As part of gesture recognition or independently, the image analyzer 106 may determine the shapes and positions of the user's hand in 3D space and in real time; see, e.g., U.S. Serial Nos. 61/587,554, 13/446,585, and 61/724,091, filed on Jan. 17, 2012, Mar. 7, 2012, and Nov. 8, 2012, respectively, the entire disclosures of which are hereby incorporated by reference. As a result, the image analyzer 106 may not only recognize gestures for purposes of providing input to the electronic device 214, but may also capture the position and shape of the user's hand in consecutive video images in order to characterize the hand gesture in 3D space and reproduce it on the display screen 218.

In one implementation, the gesture-recognition module 156 compares the detected gesture to a library of gestures electronically stored as records in a database 220, which is implemented in the image analysis system 106, the electronic device 214, or on an external storage system 222. (As used herein, the term "electronically stored" includes storage in volatile or non-volatile storage, the latter including disks, Flash memory, etc., and extends to any computationally addressable storage media (including, for example, optical storage).) For example, gestures may be stored as vectors, i.e., mathematically specified spatial trajectories, and the gesture record may have a field specifying the relevant part of the user's body making the gesture; thus, similar trajectories executed by a user's hand and head may be stored in the database as different gestures, so that an application can interpret them differently. Typically, the trajectory of a sensed gesture is mathematically compared against the stored trajectories to find a best match, and the gesture is recognized as corresponding to the located database entry only if the degree of match exceeds a threshold. The vector may be scaled so that, for example, large and small arcs traced by a user's hand will be recognized as the same gesture (i.e., corresponding to the same database record) but the gesture recognition module will return both the identity and a value, reflecting the scaling, for the gesture. The scale may correspond to an actual gesture distance traversed in performance of the gesture, or may be normalized to some canonical distance.

Figure 2B:
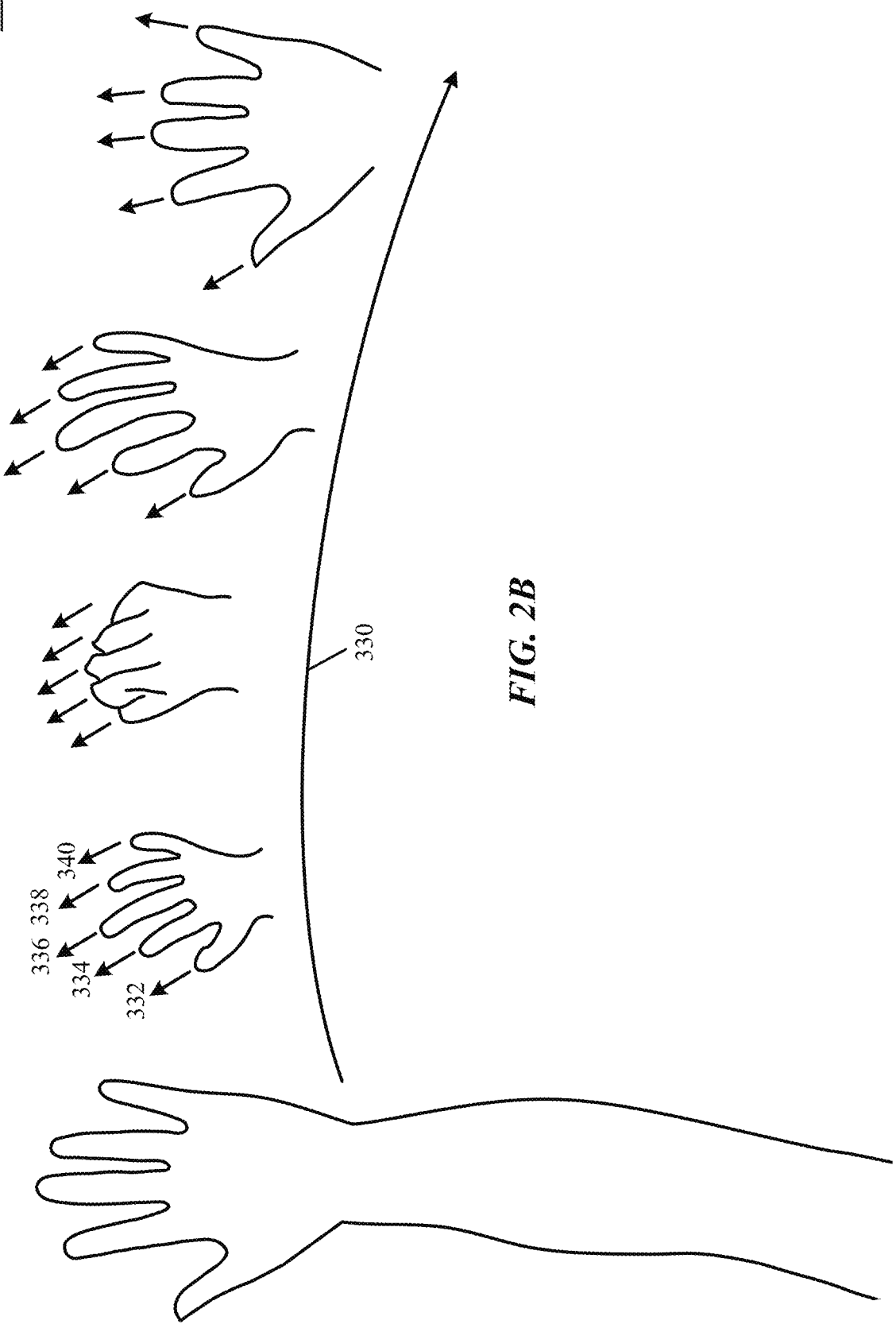
FIG. 2B depicts multiple gestures detected by the gesture-recognition system in accordance with an implementation of the technology disclosed.

In some implementations, the gesture-recognition module 156 detects more than one gesture. Referring to FIG. 2B, for example, the user may perform an arm waving gesture with her fingers flexing. The gesture-recognition module 156 detects the waving and flexing gestures 200B and records a waving trajectory 330 and five flexing trajectories 332, 334, 336, 338, 340 for the five fingers. Each trajectory may be converted into a vector along, for example, six Euler degrees of freedom (x, y, z, roll, pitch and yaw) in Euler space. The vector with the largest magnitude, for example, represents the dominant component of the motion (e.g., waving in this case) and the rest of vectors may be ignored. Of course, the fine motions of the fingers can be the dominant gesture that is isolated and interpreted, while the larger waving motion of the hand is ignored. In one implementation, a vector filter that can be implemented using filtering techniques is applied to the multiple vectors to filter the small vectors out and identify the dominant vector. This process may be repetitive, iterating until one vector—the dominant component of the motion—is identified. In some implementations, a new filter is generated every time new gestures are detected.

If the gesture-recognition system 156 is implemented as part of a specific application (such as a game or controller logic for a television), the database gesture record may also contain an input parameter corresponding to the gesture (which may be scaled using the scaling value); in generic systems where the gesture-recognition system 156 is implemented as a utility available to multiple applications, this application-specific parameter is omitted: when an application invokes the gesture-recognition system 156, it interprets the identified gesture according in accordance with its own programming.

Thus, with reference to FIG. 2A, the gesture-recognition system 156 identifies the hand gesture by reference to the database 220 and transmits signals indicative of the identified gesture to the electronic device 214. The device 214, in turn, treats the identified gesture and the scaling value as an input, and assigns an input parameter value thereto; the input parameter is then used by the application executing on the electronic device 214, facilitating gesture-based user interactions therewith. For example, the user may first move her hand in a repetitive or distinctive way (e.g., performing a waving hand gesture) to initiate communications with the electronic device 214. Upon detecting and recognizing this hand gesture, the gesture-recognition system 156 transmits a signal to the electronic device 214 indicative of user detection, in response to which the device 214 responsively renders an appropriate display (e.g., a control panel 224). The user then performs another gesture (e.g., moving her hand in an "up" or "down" direction), which, again, is detected by the gesture-recognition system 156. The gesture-recognition system 156 identifies the gesture and a scale associated therewith, and transmits this data to the electronic device 214; the device 214, in turn, interprets this information as an input parameter (as if the user had pressed a button on a remote control device) indicative of a desired action, enabling the user to manipulate the data displayed on the control panel 224 (such as selecting a channel of interest, adjusting the audio sound, or varying the brightness of the screen). In various implementations, the device 214 connects to a source of video games (e.g., a video game console or CD or web-based video game); the user can perform various gestures to remotely interact with the virtual objects 216 in the virtual environment (video game). The detected gestures and scales are provided as input parameters to the currently running game, which interprets them and takes context-appropriate action, i.e., generates screen displays responsive to the gestures. The various components of this system—the gesture-recognition system 156 and the operative elements of the device 214 that interpret gestures and generate displays based thereon—may be separate, as illustrated, or may be organized or conceptually viewed as within the image analysis system 106.

In various implementations, after the user successfully initiates communications with the gesture-recognition system 156 and the electronic device 214, the gesture-recognition system 156 generates a cursor 226 or a FIG. 228 (hereafter "cursor") representing the detected body's part (e.g., a hand) and displays it on the device's screen 218. In one implementation, the gesture-recognition system 156 coherently locks the movement of the cursor 226 on the screen 218 to follow the actual motion of the user's gesture. For example, when the user moves her hand in the upward direction, the displayed cursor 226 also moves upward on the display screen in response. As a result, the motion of the cursor 226 directly maps user gestures to displayed content such that, for example, the user's hand and the cursor 226 behave like a PC mouse and a cursor on the monitor, respectively. This allows the user to evaluate the relationship between actual physical gesture movement and the resulting actions taking place on the screen 218, e.g., movement of virtual objects 216 displayed thereon. The absolute position of the hand, therefore, is typically not important for display control; rather, a relative position and/or direction of movement of the user's body controls the on-screen action, e.g., the movement of cursor 226.

Figure 3A:
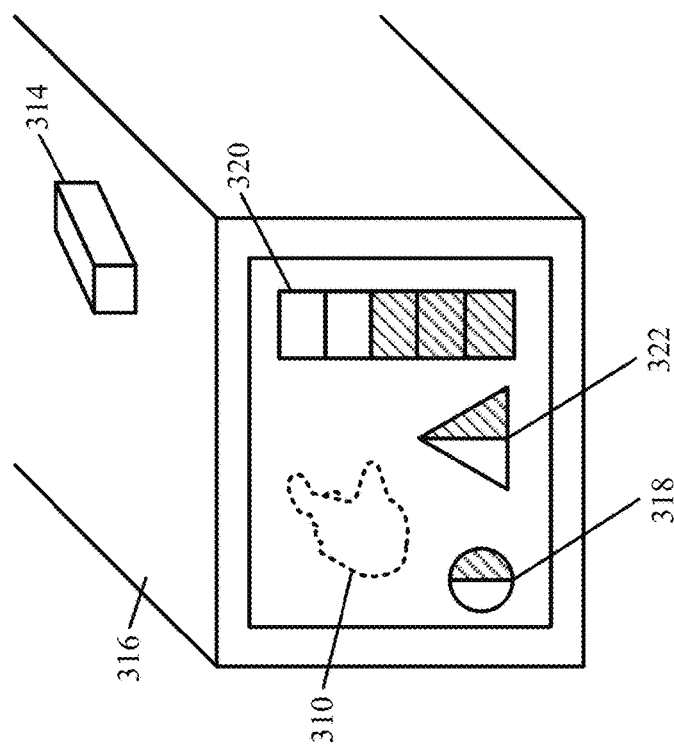
FIGS. 3A and 3B depict an on-screen indicator reflecting a degree of completion of the user's gesture in accordance with an implementation of the technology disclosed.
Figure 3A:
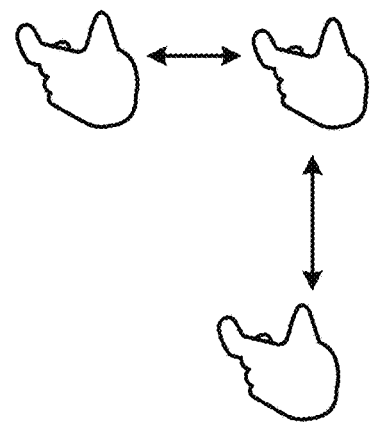

An example 300A of user interactivity is illustrated in FIG. 3A. As shown, the user performs gestures to move the displayed cursor 310 to at least partially overlap with a displayed virtual object 312 of interest. The user then performs another gesture (e.g., "finger clicking") to select the desired object 312. To label the object 312 as a user-selected object, the user's motion (i.e., movement of the body part) may be required to satisfy a predetermined threshold (e.g., 95%) of completion of the gesture; this value is stored in database 220 or is implemented by the application currently running on the electronic device 316.

For example, a completion of a "clicking" gesture, which activates a virtual control like a button, may require the user's finger to move a distance of five centimeters; upon detecting a finger movement of one centimeter, the gesture-recognition system 314 recognizes the gesture by matching it to a database record and determines a degree (in this case, 20%) of completion of the recognized gesture. In one implementation, each gesture in the database includes multiple images or vectors each of which is associated with a degree (e.g., from 1% to 100%) of completion of the performed gesture; in other implementations, the degree of completion is computed by interpolation or simple comparison of the observed vector to the stored vector. The degree of completion of the performed gesture (e.g., how much the user has moved her hand) may be rendered on the screen, and indeed, the assessment of gestural completion may be handled by the rendering application running on the device 316 rather than by the gesture-recognition system 314.

For example, the electronic device 316 may display a hollow circular icon 318 that the rendering application gradually fills in with a color or multiple colors as the device receives simple motion (position-change) signals from the gesture-recognition system 314 as the user moves her finger closer to the device 316, as she performs a clicking or "touching" gesture. The degree to which the circle is filled indicates how close the user's motion is to completing the gesture (or how far the user's finger has moved away from its original location). When the user fully performs the clicking or touching gesture, the circle is entirely filled in; this may result in, for example, labeling the virtual object 312 as a chosen object.

In some implementations, the device temporarily displays a second indication (e.g., changing the shape, color or brightness of the indicator) to confirm the object selection. The indication of the degree of gesture completion and/or the confirming indication of object selection thus enables the user to easily predict the exact moment when the virtual object is selected; accordingly, the user can subsequently manipulate the selected object on-screen in an intuitive fashion. Although the discussion herein focuses on filling of the hollow circle 318, the technology disclosed is not limited to any particular type of representation displayed on the screen that can indicate the completion of the performed gesture. For example, a hollow bar 320 progressively filled in by color, a gradient of color 322, the brightness of a color or any suitable indicator for illustrating a degree of gesture completion performed by the user may be used and is within the scope of the current technology disclosed.

The gesture-recognition system 314 continuously detects and identifies the user's gestures based on the shapes and positions of the gesturing part of the user's body in the captured 2D images. A 3D image of the gesture can be reconstructed by analyzing the temporal correlations of the identified shapes and positions of the user's gesturing body part in consecutively acquired images. Because the reconstructed 3D image can accurately detect and recognize small gestures (e.g., moving a finger a distance of less than one centimeter) in real time, the gesture-recognition system 314 provides high detection sensitivity. In various implementations, once the gesture is recognized and the instruction associated therewith is identified, the gesture-recognition system 314 transmits signals to the device 316 to activate an on-screen indicator displaying a degree of completion of the user's gesture. The on-screen indicator provides feedback that allows the user to control the electronic device 316 and/or manipulate the displayed virtual objects 312 using various degrees of movement. For example, the user gesture may be as large as a body length jump or as small as a finger clicking.

In one implementation, once the object 312 is labeled as a chosen object, the gesture-recognition system 314 locks the object 312 together with the cursor 310 on the screen to reflect the user's subsequently performed movement. For example, when the user moves her hand in the downward direction, the displayed cursor 310 and the selected virtual object 312 also move downward together on the display screen in response. Again, this allows the user to accurately manipulate the virtual objects 312 in the virtual environment.

Figure 3B:
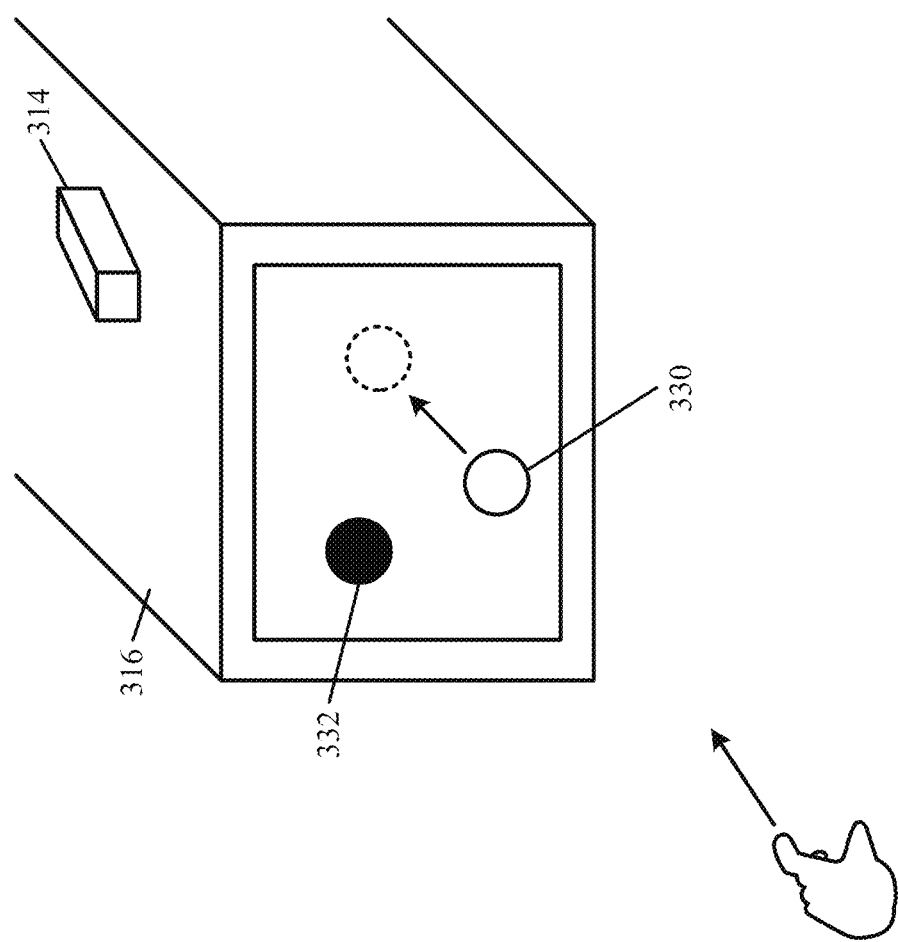

In another implementation 300B, when a virtual object is labeled as a chosen item, the user's subsequent movement is converted computationally to a simulated physical force applied to the selected object. Referring to FIG. 3B, the user, for example, first moves her first finger forward for a distance of one centimeter to complete the selection of the virtual object 330; this selection can be confirmed by the hollow circle 332 displayed on the screen being entirely filled in. The user may then move her first finger forward for another centimeter. Upon detecting such movement, the gesture-recognition system 314 converts it to a simulated force; the force may be converted based on a physics simulation model, the degree of body movement, the mass and moving velocity of the body part, gravity, and/or any other relevant parameters. The application running on the device 316, which generates the virtual object 330, responds to the force data by rendering a simulated the behavior of the virtual object 330 under the influence of the force, e.g., based on a motion model which includes the Newtonian physical principles.

For example, if the user's movement is relatively small within a predetermined range (e.g., less than one centimeter) and/or relatively slow, the converted force deforms the shape of the selected object 330; if, however, the user's movement exceeds the determined range (i.e., more than 10 centimeters) or a threshold velocity, the device 316 treats the converted force as large enough (i.e., larger than the simulated static friction force) to move the selected object 330. The motion of the object 330 upon receiving the push force is simulated by the rendering application of the device 316 based on the motion model; this motion behavior is then updated on the screen. The rendering application may take other actions with respect to the virtual object 330, e.g., stretching, bending, or operating mechanical controls over buttons, levers, hinges, handles, etc. As a result, the simulated force replicates the effect of equivalent forces in the real world and makes the interaction predictable and realistic for the user.

It should be stressed that the foregoing functional division between the gesture-recognition system 314 and the rendering application running on the device 316 is only an example; in some implementations the two entities are more tightly coupled or even unified, so that rather than simply passing generic force data to the application, the gesture-recognition system 314 has world knowledge of the environment as rendered on the device 316. In this way, the gesture-recognition system 314 can apply object-specific knowledge (e.g., friction forces and inertia) to the force data so that the physical effects of user movements on the rendered objects are computed directly (rather than based on generic force data generated by the gesture-recognition system 314 and processed on an object-by-object basis by the device 316). Moreover, in various implementations, the mocap 144 runs on the device 316, and the component 314 is a simple sensor that merely sends images (e.g., high-contrast images) to the device 316 for analysis by the mocap 144. In such implementations, the mocap 144 may be a separate application that provides gesture information to the rendering application (such as a game) running on the device 316, or, as discussed above, may be integrated within the rendering application (e.g., a game application may be provided with suitable mocap functionality). This division of computational responsibility between the system 314 and the device 316, as well as between hardware and software, represents a design choice.

Figure 3C:
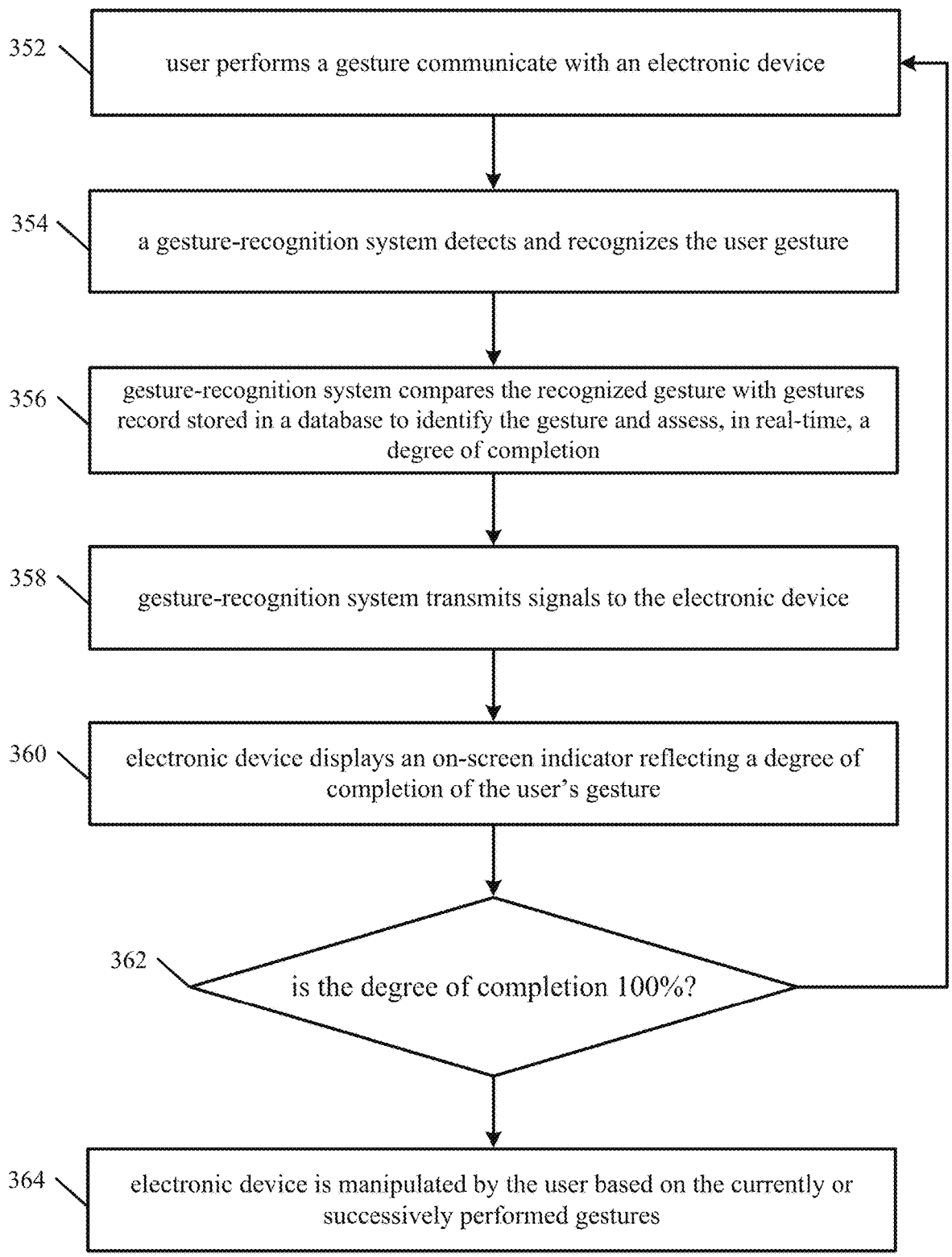
FIG. 3C is a flowchart showing a method of predicting when the virtual object is selected by a user and subsequently timely manipulating the selected object in accordance with an implementation of the technology disclosed.

A representative method 300C for supporting a user's gestural interaction with an electronic device, and particularly to monitor the degree of gestural completion so that on-screen action can be deferred until the gesture is finished, is shown in FIG. 3C. In a first action 352, the user initiates communications with an electronic device via performing a gesture. In a second action 354, the gesture is detected by a gesture-recognition system. In a third action 356, the gesture-recognition system compares the recognized gesture with gesture records stored in a database both to identify the gesture and assess, in real time, a degree of completion. The gesture-recognition system then transmits signals to the electronic device (in a fourth action 358). (As noted earlier, the degree-of-completion functionality may be implemented on the device rather than by the gesture-recognition system, with the latter system merely providing movement-tracking data.) Based on the signals, the electronic device displays an on-screen indicator reflecting a degree of completion of the user's gesture (in a fifth action 360). If the degree of completion exceeds a threshold value (e.g., 95%), the electronic device and/or the virtual objects displayed on the screen are then subsequently timely manipulated by the user based on the currently or subsequently performed gestures (actions 362, 364).

Figure 4A:
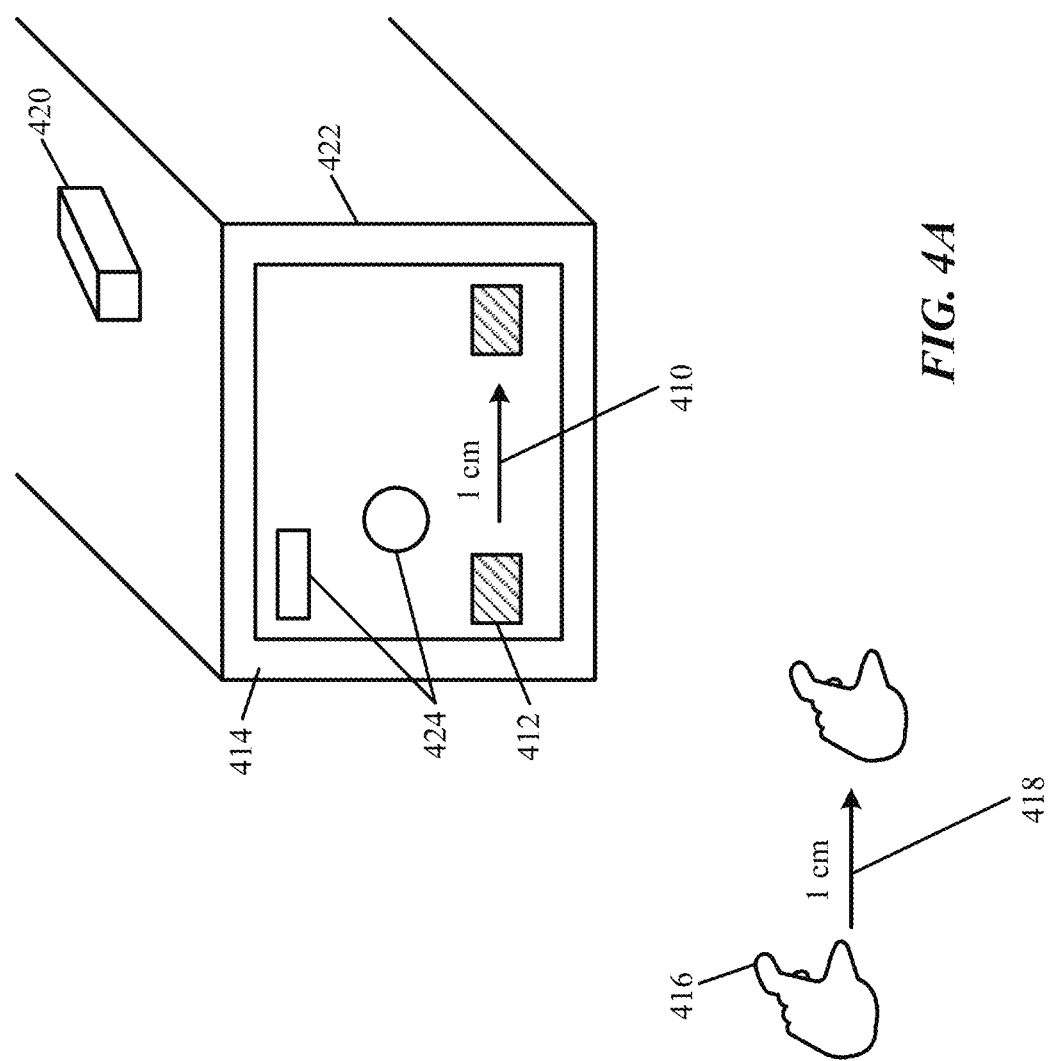
FIGS. 4A and 4B depict a dynamic adjustment of a relationship between the user's actual movements and the resulting action displayed on the screen in accordance with an implementation of the technology disclosed.

Referring to FIG. 4A, in one implementation 400A, the displayed motion 410 of the object 412 on the screen 414 is determined based on the absolute spatial displacement of the user's actual movement. For example, the user may first slide his hand 416 to the right as indicated at 418 for one centimeter; upon detecting and recognizing this hand gesture, the gesture-recognition system 420 transmits a signal to the electronic device 422 indicative of the movement, which the device interprets as an input parameter and, in response, takes action to move (i.e., to render as moving) the cursor or virtual object 412 in the same direction for, for example, one hundred pixels on the screen 414. The relationship between the user's physical movement and the rendered movement can be set by the user by, for example, altering the scaling factor stored by the gesture-recognition system 420 for the associated gesture. If the gesture-recognition system 420 is integrated with a rendering application, the user can make this change with gestures.

For example, the user may specify a larger on-screen movement (i.e., more pixels traversed) of the cursor or object 412 in response to a given hand movement. The user may first activate a ratio control panel 424 displayed on the screen by performing a distinct gesture. The control panel 424 may be rendered, for example, as a slide bar, a circular scale, or any suitable form. The user subsequently performs another gesture to adjust the ratio based on the style of the scale control panel 424. If the scale control panel is a slide bar, the user slides her finger to vary the ratio. In another implementation, no scale control panel is displayed on the screen; the ratio is adjusted based on the user's subsequent gestures. As another example, the user may increase the scale ratio by opening her first or moving her thumb and first finger apart and reduce the scale ratio by closing her first or moving her first finger towards the thumb. Although the discussion herein focuses on hand or finger gestures for purposes of illustration, the technology disclosed is not limited to any gesture performed by any particular part of the human body. Any suitable gesture for communications between the user and the electronic device may be used and is within the scope of the current technology disclosed.

In still other implementations, the ratio adjustment is achieved using a remote-control device, which the user controls by pushing buttons, or using a wireless device such as a tablet or smart phone. A different scaling ratio may be associated with each gesture (i.e., the scaling ratio is local and potentially different for each gesture) and is stored in the specific gesture record in the database. Alternatively, the scaling ratio may be applicable to several or all gestures stored in the gesture database (i.e., the scaling ratio is global and the same across at least several gestures).

Figure 4B:
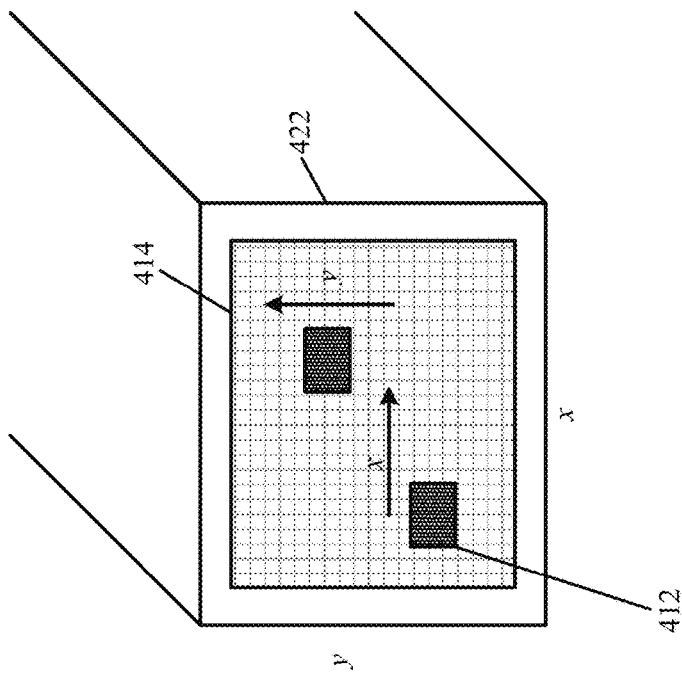
Figure 4B:
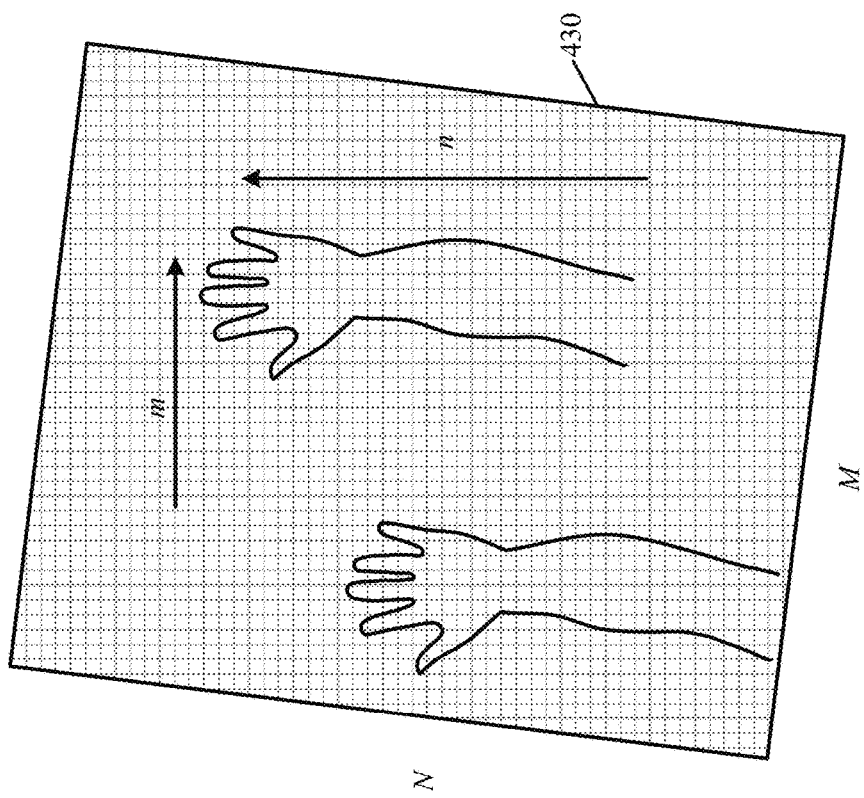

Alternatively, the relationship between physical and on-screen movements is determined, at least in part, based on the characteristics of the display and/or the rendered environment. For example, with reference to FIG. 4B, in one implementation 400B, the acquired (camera) image 430 of the user has light brightness values in the form of a matrix of M×N pixels and the (rendered) frame of the display screen of the electronic device 422 has X×Y pixels. When the user makes a hand waving gesture 420 that results in an m-pixel horizontal displacement (or m-pixel distance) and an n-pixel vertical displacement (or n-pixel distance) in the camera images, the relative horizontal and vertical hand movements are set as m/M, n/N, respectively, for scaling purposes. In response to this hand gesture, the cursor or object 412 on the display screen 414 may be moved (x, y) pixels, where x and y are determined as x=m/M×X, y=n/N×Y, respectively, in the simplest case. But even to display essentially unitary (1:1) scaling adjusted for the relative sizes of the user's environment and the display screen, account is generally taken of the camera position and distance from the user, focal length, resolution of the image sensor, viewing angle, etc., and as a result the quantities x and y are multiplied by a constant that results in an essentially affine mapping from "user space" to the rendered image. Once again, the constant may be adjusted to amplify or decrease on-screen movement responsiveness. Such user interactions with the virtual object 412 on the display screen may provide the user with a realistic feeling while moving the object in the virtual environment.

The scaling relationship between the user's actual movement and the resulting action taking place on the display screen may result in performance challenges, especially when limited space is available to the user. For example, when two family members sit together on a couch playing a video game displayed on a TV, each user's effective range of motion is limited by the presence of the other user. Accordingly, the scaling factor may be altered to reflect a restricted range of motion, so that small physical movements correspond to larger on-screen movements. This can take place automatically upon detection, by the gesture-recognition system, of multiple adjacent users. The scaling ratio may also depend, in various implementations, on the rendered content of the screen. For example, in a busy rendered environment with many objects, a small scaling ratio may be desired to allow the user to navigate with precision; whereas for simpler or more open environments, such as where the user pretends to throw a ball or swing a golf club and the detected action is rendered on the screen, a large scaling ratio may be preferred.

As noted above, the proper relationship between the user's movement and the corresponding motion displayed on the screen depends on the user's position relative to the recording camera. For example, the ratio of the user's actual movement m to the pixel size M in the captured image depends on the viewing angle of the camera implemented in the gesture-recognition system 420 as well as the distance between the camera and the user. If the viewing angle is wide or the user is at a distance far away from the camera, the detected relative movement of the user's gesture (i.e., m/M) is smaller than it would be if the viewing angle was not so wide or the user was closer to the camera. Accordingly, in the former case, the virtual object moves too little on the display in response to a gesture, whereas in the latter case the virtual object moves too far. In various implementations, the ratio of the user's actual movement to the corresponding movement displayed on the screen is automatically coarsely adjusted based on, for example, the distance between the user and the gesture-recognition system (which may be tracked by ranging); this allows the user to move toward or away from the gesture-recognition system without disrupting the intuitive feel that the user has acquired for the relationship between actual and rendered movements.

In various implementations, when the gesture is recognized but the detected user movement is minuscule (i.e., below a predetermined threshold), the gesture-recognition system 420 switches from a low-sensitivity detection mode to a high-sensitivity mode where a 3D image of the hand gesture is accurately reconstructed based on the acquired 2D images and/or a 3D model. Because the high-sensitivity gesture-recognition system can accurately detect small movements (e.g., less than a few millimeters) performed by a small part of the body, e.g., a finger, the ratio of the user's actual movement to the resulting movement displayed on the screen may be adjusted within a large range, for example, between 1000:1 and 1:1000.

Figure 4C:
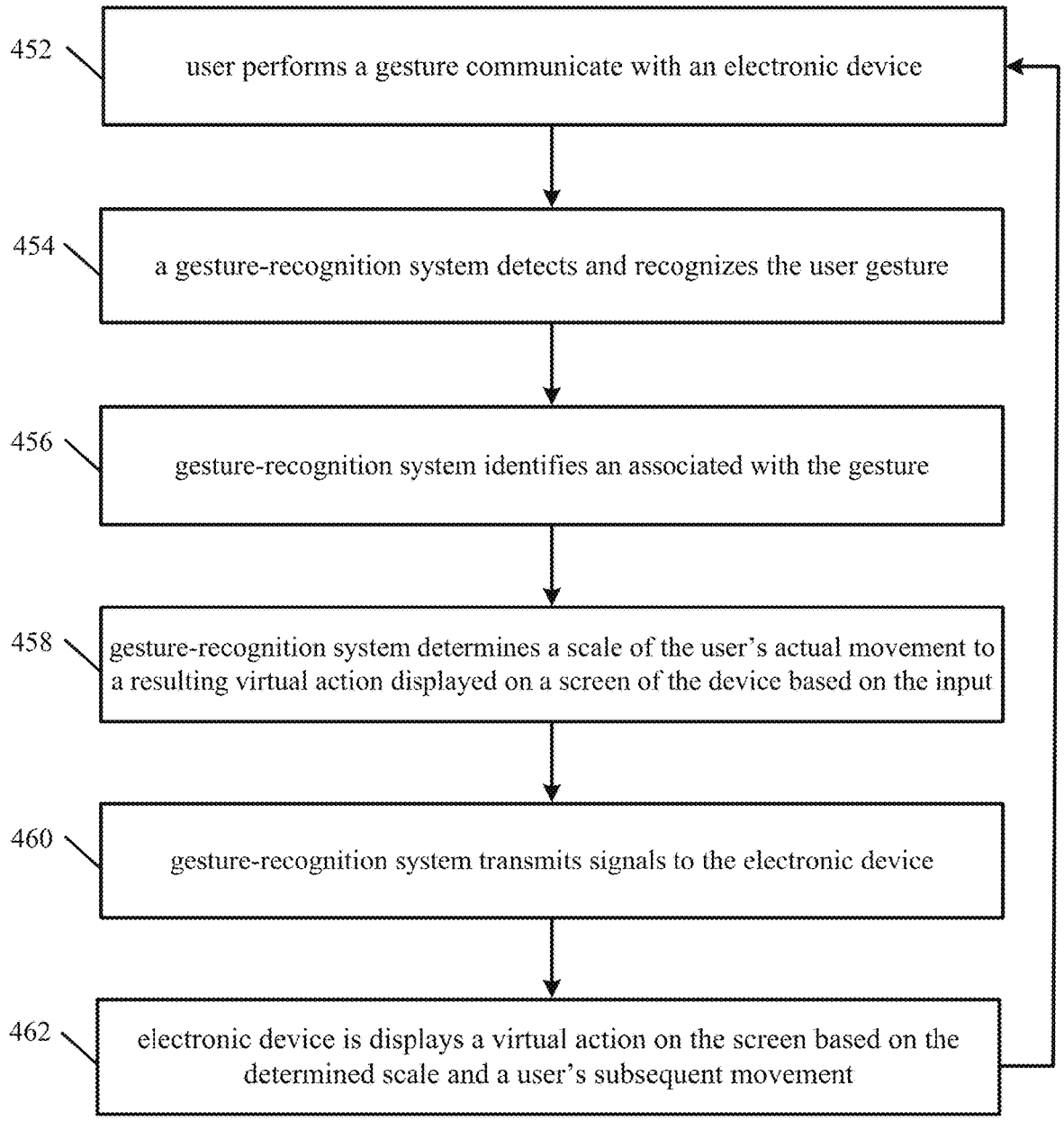
FIG. 4C is a flowchart showing a method of dynamically adjusting the relationship between a user's actual motion and the resulting object movement displayed on the electronic device's screen in accordance with an implementation of the technology disclosed.

A representative method 400C for a user to dynamically adjust the relationship between her actual motion and the resulting object movement displayed on the electronic device's screen in accordance with implementations of the current technology disclosed is shown in FIG. 4C. In a first action 452, the user initiates communications with an electronic device by performing a gesture. In a second action 454, the gesture is detected and recognized by a gesture-recognition system. In a third action 456, the gesture-recognition system identifies an instruction associated with the gesture by comparing the detected gesture with gestures stored in a database. The gesture-recognition system then determines the ratio of the user's actual movement to a resulting virtual action displayed on a screen of the device based on the instruction (in a fourth action 458). The gesture-recognition system then transmits signals to the electronic device (in a fifth action 460) indicative of the instruction. In a sixth action 462, upon receiving the signals, the electronic device displays a virtual action on the screen based on the determined ratio and a user's subsequent movement.

Figure 5A:
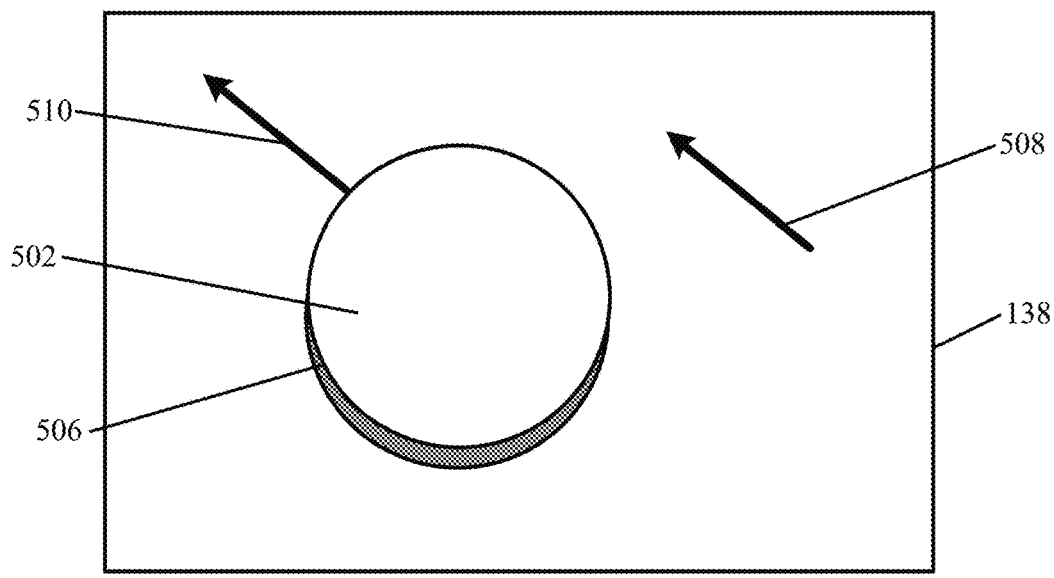
FIGS. 5A and 5B depict a puck user-interface element in accordance with implementations of the technology disclosed.

The system 100B, via the display 138, may present a variety of user-interface elements to the user to facilitate interaction therewith. The user-interface elements may be created in response to certain gestures (or other forms of input) from the user or created by software programs executing on the processor 132 (e.g., the mocap program 144 or other application or gaming programs). In one implementation, the display 138 features a disk-like "puck" user-interface element 502 on the display 138, as shown in FIG. 5A. The gesture-recognition system 314, as described above, recognizes a gesture from a user and, in accordance with implementations of the technology disclosed, moves the puck 502 accordingly. In one implementation, a representation 504 of a user's hand also appears on the display 138; as the representation 504 touches and moves against a side 506 of the puck 502 in a first direction 508, the puck moves in a corresponding direction 510 with the motion of the representation 504. The user may, via the representation 504, similarly touch the puck 502 at any point on its side, make a gesture "pushing" the puck 502, and thereby cause the puck 502 to move in a corresponding direction.

The implementation of the technology disclosed illustrated in FIG. 5A is one illustrative example; the technology disclosed is not limited to only this implementation. The representation 504 of the user's hand may not be present on the screen 138; the gesture-recognition system 314 may recognize a gesture from a user as a gesture meant to push the puck 502 without displaying the representation 504. The user may create the gesture using other portions of his or her hand (e.g., the palm) or with other body parts or objects. In other implementations, the representation 504, if displayed, may include other objects, such as a stylus or paintbrush, or other body parts of a user. The puck 502 may be any size or shape, such as a circle, square, oval, or triangle.

Figure 5B:
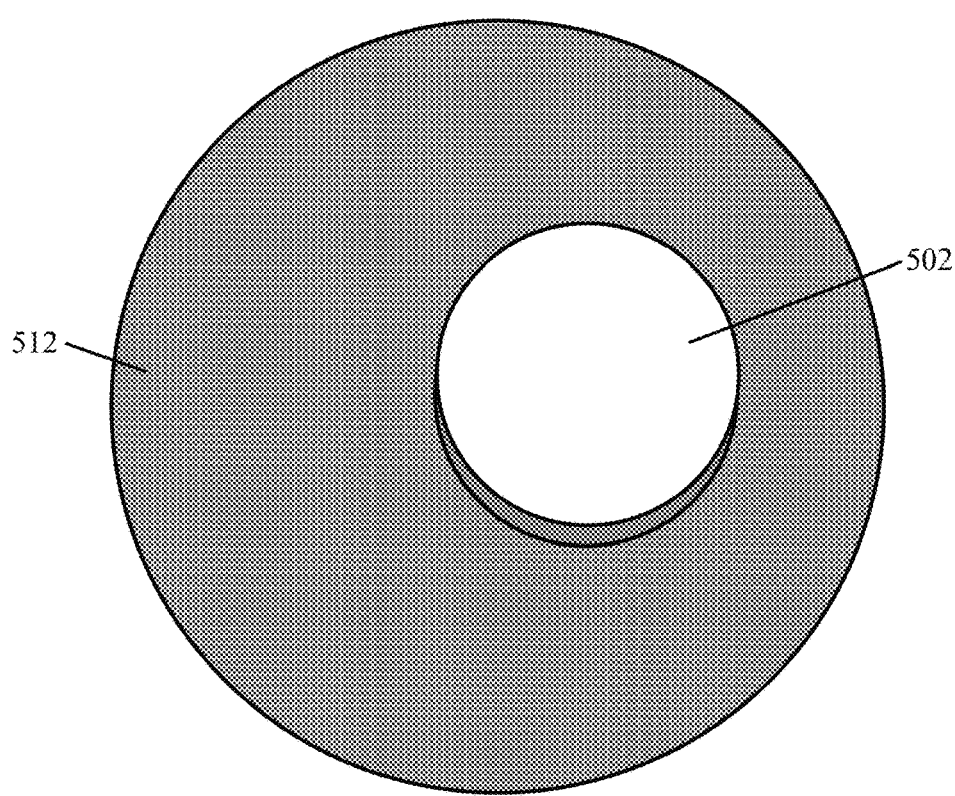

The position of the puck 502 may be used as an input or other variable to a computer program, display setting, game, or any other such software application. In one implementation, the x position of the puck 502 controls a first variable and the y position of the puck 502 controls a second (related or unrelated) variable. FIG. 5B illustrates one such application; a grayscale selection widget 512 includes a puck 502. By pushing the puck 502, via one or more gestures, a user may select a grayscale value on the selection widget 512. For example, the grayscale value corresponding to the center of the puck 502 may be selected thereby for use with, e.g., a computer painting program. The selection widget 512 may include a plurality of any other such values (e.g., color) for selection therefrom via the puck 502.

The puck 502 may move, in response to a user gesture, in any number of different fashions. For example, the puck 502 may continue to move for a period of time after a user has ceased pushing it and may decelerate to a stop in accordance with a virtual mass and virtual coefficient of friction with the widget 512 (or other similar values). The puck 502 may initially move only after the user's gesture has made contact with a side thereof and the user's further motion has crossed a minimum threshold distance (i.e., the puck is "sticky" and requires an initial minimum amount of distance to be covered by the gesture before it becomes "unstuck"). In one implementation, the puck 502 is tethered to a point on the widget 512 by a virtual "spring" and returns to the point, in accordance with the virtual spring coefficient, when the user's gesture ceases contact with the puck 502. Pressing the top surface of the puck, like a traditional button, may cause a further action to occur. In one implementation, after pressing the top surface of the puck 502, the user may make a rotational gesture, and the gesture-recognition system 314 may rotate the puck accordingly (and alter a parameter of an application accordingly).

In other implementations of the technology disclosed, the user may create additional user-interface elements with gestures and subsequently interact with those elements. For example, the gesture-recognition system 314 may detect that a user has made a circle motion with a finger (or other object) and interpret the circle motion as a desire to create a button on the display 138. Once created, the user may interact with the user-interface element (by, e.g., pressing the button) and thereby causing an associated function to be performed. The function may be determined by the context presented on the display 138, by the location on the display 138 at which the user-interface element is created, or by other user input.

In another implementation, the gesture-recognition system 314 creates a slider bar in response to a user gesture, such as the user extending two fingers (e.g., his or her index and middle finger) and making a gesture therewith (e.g., a motion parallel to the plane of the display 138). Once created, the slider bar may be used to control an appropriate application (e.g., scrolling through pages or segments of a document, menu, or list).

In another implementation, gesture-recognition system 314 interprets a forward or reverse finger-pointing gesture by the user as a "mouse click" (or other similar selection or confirmation command). The user may point his or her finger at or toward the display 138 and move the finger in the direction of its long axis at or toward the display 138; the gesture-recognition system 314 interprets this gesture as a mouse click if the distance over which the finger moves exceeds a threshold (e.g., 1, 5, or 10 cm). In one implementation, the gesture is interpreted as a mouse click only if at least a certain percentage (e.g., 50%) of its motion is in the direction the finger is pointing. A similar gesture moving in a direction away from the display 138 may be interpreted as another or different user input. In one implementation, a forward gesture is a left mouse click and a reverse gesture is a right mouse click.

Other user gestures, motions of other objects, or combinations thereof may be collectively captured and used to determine a rotation factor. The gesture-recognition system 314 may analyze all, or most, of the motion present in a series of captured images and produce a single rotation factor based thereon (express, for example, as a number of degrees of rotation). In one implementation, the gesture-recognition system 314 selects a focal point at or near a center of the captured motion, computes an amount of rotation for each of the moving objects with respect to the focal point, and computes an average amount of rotation based thereon. The motions of different objects may be weighted in the average based on their acceleration, velocity, size, nearness to the display 138, or other similar factors. The single rotation factor may then be used as an input to a program running on the system 100B.

The above-described 3D user interaction technique described herein therefore enables the user to intuitively control and manipulate the electronic device and virtual objects by simply performing body gestures. Because the gesture-recognition system facilitates rendering of reconstructed 3D images of the gestures with high detection sensitivity, dynamic user interactions for display control are achieved in real time without excessive computational complexity. For example, the user can dynamically control the relationship between his actual movement and the corresponding action displayed on the screen. In addition, the device may display an on-screen indicator to reflect a degree of completion of the user's gesture in real time. The current technology disclosed thus enables the user to dynamically interact with virtual objects displayed on the screen and advantageously enhances the realism of the virtual environment.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein may be used without departing from the spirit and scope of the technology disclosed. Accordingly, the described implementations are to be considered in all respects as only illustrative and not restrictive.

Particular Implementations

In one implementation, a method of distinguishing meaningful gestures from proximate non-meaningful gestures in a three-dimensional (3D) sensory space is described. The method includes distinguishing wrist and finger flexing from an overall trajectory of an arm gesture while the arm is in motion by detecting positions of the arm and attached wrist and fingers in a 3D sensory space using an electronic sensor, calculating from a series of the detected positions a spatial trajectory of a waving gesture executed by the arm, calculating from the detected positions spatial trajectories of the flexing gestures of the wrist and/or fingers, and determining whether the waving gesture dominates the flexing gestures based on magnitudes of the respective spatial trajectories. A wrist and finger flexing refers to an inward and/or outward movement of the fingers towards and/or away from a wrist. In another implementation, a waving gesture executed by an arm refers to an inward and/or outward extension of the arm from side to side. The method further includes triggering a response to the dominant gesture without triggering a response to the non-dominant gesture.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

In one implementation, the magnitude of the spatial trajectory of the waving gesture is determined at least in part by a distance traversed in performance of the waving gesture. In another implementations, the magnitudes of the spatial trajectories of the flexing gestures are determined at least in part by a scale of curling of the fingers.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In another implementation, a method of distinguishing between two simultaneous gestures originating from a single object in a 3D sensory space is described. The method includes distinguishing wrist and finger flexing from an overall trajectory of an arm gesture while the arm is in motion by detecting positions of the arm and attached wrist and fingers in a 3D sensor space using an electronic sensor, calculating from a series of the detected positions a spatial trajectory of a waving gesture executed by the arm, wherein magnitude of the spatial trajectory is determined at least in part by a distance traversed in performance of the waving gesture, calculating spatial trajectories of the flexing gestures of the wrist and/or fingers, wherein magnitudes of the spatial trajectories is determined at least in part by a scale of curling of the fingers and degrees of freedom between the fingers, and evaluating magnitudes of respective spatial trajectories and determining a dominant gesture based on magnitudes of the spatial trajectories. A wrist and finger flexing refers to an inward and/or outward movement of the fingers towards and/or away from a wrist. In another implementation, a waving gesture executed by an arm refers to an inward and/or outward extension of the arm from side to side. The method further includes triggering a response to the overall trajectory dependent on the dominant gesture.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In another implementation, a method of uniformly responding to gestural inputs from a user irrespective of a position of the user in a 3D sensory space is described. The method includes automatically adapting a responsiveness scale between gestures in a physical space and resulting responses in a gestural interface by calculating a control object's distance from a camera electronically coupled to the gestural interface, scaling an apparent angle traversed by movement in the camera's field of view to a scaled movement distance based on the control object's distance from the camera, and automatically proportioning responses to the scaled movement distance of gestures in the physical space rather than the apparent angle traversed.

This method and other implementations of the technology disclosed can include one or more of the following features and/or features described in connection with additional methods disclosed.

The method also includes decreasing on-screen responsiveness of the gestural interface when the apparent angle traversed is below a threshold value. The method further includes amplifying on-screen responsiveness of the gestural interface when the apparent angle traversed is above a threshold value.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In another implementation, a method of adjusting responsiveness of virtual objects of a gestural interface in a 3D sensory space is described. The method includes automatically adjusting a responsiveness scale between gestures in a physical space and resulting responses of virtual objects in a gestural interface by calculating a virtual object density of the gestural interface based on a numerosity of the virtual objects and automatically proportioning on-screen responsiveness of the virtual objects to the gestures responsive to the virtual object density in the gestural interface.

This method and other implementations of the technology disclosed can include one or more of the following features and/or features described in connection with additional methods disclosed.

The method also includes automatically specifying a low on-screen responsiveness of virtual objects in response to a particular gesture when the content density is above a threshold value. The method further includes automatically specifying a high on-screen responsiveness of virtual objects in response to the particular gesture when the content density is below a threshold value.

In yet another implementation, a method of uniformly responding to gestural inputs from multiple users within a 3D sensory space is described. The method includes automatically adapting a responsiveness scale between gestures in a physical space from multiple users and resulting responses in a shared gestural interface by calculating a user spacing within a 3D sensory space based on a spacing of users detected in the 3D sensory space and automatically proportioning on-screen responsiveness of the shared gestural interface responsive to the user spacing when interpreting movement distances of the gestures in the physical space.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In yet another implementation, a method of detecting if a user has intended to interact with a virtual object in a 3D sensory space is described. The method includes detecting a clicking gesture of a finger in a 3D sensory space using an electronic sensor and determining whether to interpret the clicking gesture as interaction with a virtual object in the 3D sensory space dependent on a degree of completion of the clicking gesture. A clicking gesture of a finger refers to a downward or upward extension of one finger while a different finger remains extended or curled. The determination includes calculating a distance traversed by the finger in performance of the clicking gesture, accessing a gesture database to determine a gesture completion value for the calculated distance corresponding to the clicking gesture, and recognizing the clicking gesture as manipulating the virtual object responsive to the gesture completion value crossing a threshold value.

This method and other implementations of the technology disclosed can include one or more of the following features and/or features described in connection with additional methods disclosed.

In one implementation, the gesture database includes trajectories of different gestures and corresponding gesture completion values. In another implementation, the method includes calculating the degree of completion of the clicking gesture by comparing a spatial trajectory of the clicking gesture to at least one spatial trajectory stored in the gesture database. It also includes measuring the degree of completion of the clicking gesture by linking performance of the clicking gesture to an interface element representing the virtual control and modifying the interface element in real-time as the clicking gesture is performed. In yet another implementation, the method further includes a hollow circular icon as an interface element and modifying the icon in real-time by gradually filling it in response to the clicking gesture.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In one implementation, a method of detecting if a user has intended to interact with a virtual object in a 3D sensory space is described. The method includes detecting a clicking gesture of a finger in a 3D sensory space using an electronic sensor, activating an on-screen indicator displaying a degree of completion of the clicking gesture responsive to detecting the clicking gesture, and modifying a virtual object responsive to the degree of completion of the clicking gesture exceeding a threshold value. A clicking gesture of a finger refers to a downward or upward extension of one finger while a different finger remains extended or curled.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In another implementation, a method of manipulating a virtual object in a 3D sensory space is described. The method includes selecting a virtual object of a gestural interface in response to detecting a clicking gesture of a finger in a 3D sensory space and detecting a subsequent pointing gesture of the finger in the 3D sensory space while the virtual object remains selected and calculating a force vector of the pointing gesture. A licking gesture of a finger refers to a downward or upward extension of one finger while a different finger remains extended or curled. In another implementation, the magnitude of the force vector is based on a distance traversed by the finger in performance of the pointing gesture and a velocity of the finger during the performance of the pointing gesture. The method further includes applying the force vector on the virtual object and modifying the virtual object when the magnitude of the force vector exceeds a threshold value.

This method and other implementations of the technology disclosed can include one or more of the following features and/or features described in connection with additional methods disclosed.

In one implementation, the modification of the virtual object includes changing a shape of the virtual object. In another implementation, the modification of the virtual object includes changing a position of the virtual object.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In another implementation, a method of creating interface elements in a 3D sensory space is described. The method includes detecting a circular sweep of a finger in a 3D sensory space using an electronic sensor, constructing an on-screen button in a gestural interface responsive to the circular sweep, detecting a subsequent lateral sweep of the finger in the 3D sensory space, and registering a pressing of the on-screen button responsive to the subsequent lateral sweep and performing at least one associated function. A circular sweep of a finger refers to a clockwise or anti-clockwise movement of the finger in free space. In another implementation, a lateral sweep of a finger refers to a forward or backward movement of the finger with the fingertip pointing towards an on-screen control.

This method and other implementations of the technology disclosed can include one or more of the following features and/or features described in connection with additional methods disclosed.

In one implementation, the associated function is selected based on a context of the gestural interface. In another implementation, the associated function is selected based on a location of the on-screen button on the gestural interface. The method also includes interpreting the lateral sweep as a left mouse click if at least a threshold percentage of its motion is in a direction the finger is pointing. It further includes including interpreting the lateral sweep as a right mouse click if at least a threshold percentage of its motion is in a direction opposite to which the finger is pointing.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In another implementation, a method of creating interface elements in a 3D sensory space is described. The method includes detecting a two-finger vertical sweep in a 3D sensory space, constructing a vertical slide bar in a gestural interface responsive to the two-finger vertical sweep, detecting a subsequent one-finger vertical sweep in the 3D sensory space proximate to the vertical slide bar, and scrolling the vertical slide bar responsive to the one-finger vertical sweep and performing at least one associated function. A two-finger vertical sweep refers to an upward or downward movement of two fingers of a hand in free space while other fingers of the hand are curled. In another implementation, a one-finger vertical sweep refers to an upward or downward movement of a finger of a hand in free space while other fingers of the hand are curled.

This method and other implementations of the technology disclosed can include one or more of the following features and/or features described in connection with additional methods disclosed.

In one implementation, the associated function is selected based on a context of the gestural interface. In another implementation, the associated function is selected based on a location of the vertical slide bar on the gestural interface.

In yet another implementation, a method of manipulating a grayscale selection widget using free-form gestures in a 3D sensory space is described. The method includes linking a grayscale selection widget to an on-screen puck by modifying grayscale values on the grayscale selection widget responsive to movement of the on-screen puck. It includes changing a position of the on-screen puck responsive to detecting a finger flicking gesture in a 3D sensory space using an electronic sensor and selecting a particular grayscale value on the grayscale selection widget corresponding to x or y position of the on-screen puck. A finger flicking gesture refers to a first finger being in a restraining position with respect to a second finer followed a rapid movement of the second finger away from the first finger.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In yet another implementation, a method of manipulating multiple controls of a gestural interface using free-form gestures in a three-dimensional (3D) sensory space is described. The method includes linking a display setting and grayscale selection widget to an on-screen puck by modifying a brightness values for the display setting widget and a grayscale value on the grayscale selection widget responsive to movement of the on-screen puck. It includes changing a position of the on-screen puck responsive to detecting a finger flicking gesture in a three-dimensional (3D) sensory space using an electronic sensor and selecting a particular brightness value and grayscale value corresponding to x and y position of the on-screen puck.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In yet another implementation, a method of creating interface elements in a 3D sensory space is described. The method includes detecting a circular sweep of a finger in a 3D sensory space using an electronic sensor, constructing an on-screen puck in a gestural interface responsive to the circular sweep, detecting a subsequent swirling motion of the finger in the 3D sensory space, and rotating the on-screen puck responsive to the subsequent swirling motion and performing at least one associated function. A circular sweep of a finger refers to a clockwise or anti-clockwise movement of the finger in free space. In another implementation, swirling motion of the finger refers to a repeatedly performed clockwise or anti-clockwise movement of the finger in free space in conjunction with an upward or downward movement of the finger.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In another aspect, the technology disclosed pertains to a method of controlling dynamic user interactions with a device. In representative implementations, the method includes capturing multiple temporally sequential images of the user; computationally analyzing the images of the user to recognize a user's gesture and identify a scale associated therewith, the scale being indicative of an actual gesture distance traversed in performance of the gesture; computationally determining a ratio between the scale and a displayed movement corresponding to an action to be displayed on the device; displaying the action on the device based on the ratio; and adjusting the ratio based on an external parameter. The external parameter may be the actual gesture distance or the ratio of a pixel distance in the captured images corresponding to performance of the gesture to the size, in pixels, of the display screen.

In various implementations, analyzing the images of the user includes (i) identifying shapes and positions of one or more human body parts in the images and (ii) reconstructing a position and a shape of the human body part in 3D space based on correlations between the identified shapes and positions of the body part in the images. In one implementation, analyzing the images of the user further includes temporally combining the reconstructed positions and shapes of the body part in 3D space. Additionally, the method may include defining a 3D model of the body part and reconstructing the position and shape of the body part in 3D space based on the 3D model.

The scale may be identified by comparing the recognized gesture with records in a gesture database and the gesture database may include a series of electronically stored records each relating a gesture to an input parameter. Additionally, the gestures may be stored in the records as vectors.

In another aspect, the technology disclosed relates to a system enabling dynamic user interactions with a device having a display screen. In various implementations, the system includes one or more cameras oriented toward a field of view; one or more sources to direct illumination onto the user in the field of view; a gesture database including a series of electronically stored records, each of the records relating a gesture to an input parameter; and an image analyzer coupled to the camera and the database. In one implementation, the image analyzer is configured to operate the camera to capture multiple temporally sequential images of the user, analyze the images of the user to recognize a gesture performed by the user, and compare the recognized gesture with records in the gesture database to identify an input parameter associated therewith; the input parameter corresponds to an action for display on the display screen in accordance with the ratio between an actual gesture distance traversed in performance of the gesture and the displayed movement corresponding to the action, and the image analyzer adjusts the ratio based on an external parameter.

The image analyzer may be further configured to (i) identify shapes and positions of one or more parts of a human body in the images of the user and (ii) reconstruct a position and a shape of the part of the human body in 3D space based on correlations between the identified shapes and positions of the body part in the images of the user. In addition, the image analyzer may be configured to define a 3D model of the body part and reconstruct the position and shape of the body part in 3D space based on the 3D model. In one implementation, the image analyzer is configured to estimate a trajectory of the body part in 3D space.

The external parameter may be the actual gesture distance or the ratio of the pixel distance in the captured images corresponding to performance of the gesture to the size, in pixels, of the display screen. The ratio may be local to each gesture and stored in each gesture record in the database; or the ratio may instead be global across all gestures in the gesture database.

Another aspect of the technology disclosed pertains to a method of dynamically displaying user interactions with a device. In representative implementations, the method includes (i) capturing multiple temporally sequential images of the user, (ii) computationally analyzing the images of the user to recognize a user's gesture, (iii) comparing the recognized gesture with records in a gesture database to identify the gesture, (iv) computationally determining a degree of completion of the recognized gesture, and (v) modifying contents of a display of the device in accordance with the determined degree of completion. The contents may include an icon, a bar, a color gradient, or a color brightness.

In various implementations, the method includes repeating actions (i)-(v) until the degree of completion exceeds a predetermined threshold value and thereafter causing the device to take a completion-triggered action. In one implementation, analyzing the image of the user includes identifying shapes and positions of one or more parts of the user's body in the images. In some implementations, the method further includes displaying an action responsive to the gesture in accordance with a physics simulation model and based on the degree of gesture completion. The displayed action may be further based on a motion model that is constructed based on a simulated physical force, gravity, and/or a friction force.

In yet another aspect, the technology disclosed relates to a system enabling dynamic user interactions with a device. In some implementations, the system includes one or more cameras oriented toward a field of view; one or more sources (e.g., a light source and/or a sonic source) for directing illumination onto the user in the field of view; a gesture database including a series of electronically stored records, each of which specifies a gesture; and an image analyzer coupled to the camera. In one implementation, the image analyzer is configured to operate the camera to capture multiple images of the user, analyze the images of the user to recognize a user's gesture, compare the recognized gesture records in a gesture database to identify the gesture, determine a degree of completion of the recognized gesture, and display an indicator on a screen of the device reflecting the determined degree of completion. The indicator may include an icon, a bar, a color gradient, or a color brightness.

In various implementations, the image analyzer is configured to determine whether the degree of completion exceeds a predetermined threshold value and, if so, to cause the device to take a completion-triggered action. The image analyzer may be further configured to display an action responsive to the gesture in accordance with a physics simulation model and based on the degree of gesture completion. The displayed action may be further based on a motion model.

Still another aspect of the technology disclosed relates to a method of controlling dynamic user interactions with a device. In representative implementations, the method includes capturing multiple temporally sequential images of the user, computationally analyzing the images of the user to recognize multiple user gestures, computationally determining a dominant gesture, and displaying an action on the device based on the dominant gesture.

The dominant gesture may be determined by filtering the multiple gestures. In one implementation, the filtering is performed iteratively. Additionally, each of the gestures may be computationally represented as a trajectory. In some implementations, each trajectory is computationally represented as a vector along six Euler degrees of freedom in Euler space and the vector having a largest magnitude is determined to be the dominant gesture.

In various implementations, analyzing the images of the user includes (i) identifying shapes and positions of one or more human body parts in the images and (ii) reconstructing a position and a shape of the human body part in 3D space based on correlations between the identified shapes and positions of the body part in the images. In one implementation, the method further includes defining a 3D model of the body part and reconstructing the position and shape of the body part in 3D space based on the 3D model. Analyzing the images of the user includes temporally combining the reconstructed positions and shapes of the body part in 3D space.

In another aspect, the technology disclosed relates to a system of controlling dynamic user interactions with a device. In various implementations, the system includes one or more cameras oriented toward a field of view; one or more sources (e.g., a light source and/or a sonic source) to direct illumination onto the user in the field of view; a gesture database including a series of electronically stored records, each of which specifying a gesture; and an image analyzer coupled to the camera and the database. In one implementation, the image analyzer is configured to operate the camera to capture multiple temporally sequential images of the user, analyze the images of the user to recognize multiple user gestures, determine a dominant gesture, and display an action on the device based on the dominant gesture.

The image analyzer may be further configured to determine the dominant gesture by filtering the multiple gestures. In one implementation, the filtering is performed iteratively. Additionally, the image analyzer may be further configured to represent each of the gestures as a trajectory. Each trajectory may be represented as a vector along six Euler degrees of freedom in Euler space and the vector having a largest magnitude is determined to be the dominant gesture.

In one aspect, a method of controlling dynamic user interactions with a device includes capturing a plurality of temporally sequential images of the user, computationally analyzing a subset of the images of the user to recognize a user's gesture as making contact with a position of an on-screen puck, computationally analyzing a further subset of the images of the user to recognize the user's gesture as moving the on-screen puck to a new position, and modifying a parameter of a software application in accordance with the new position of the puck.

The puck may be a circle, square, or triangle; the parameter may be a color and sliding the puck may change the color. Recognizing the user's gesture as sliding the on-screen puck may include the gesture crossing a threshold distance before the parameter is modified. The puck may continue to move for a period of time after the user's gesture has ceased making contact with the puck. The puck may spring back to a fixed position after the user's gesture has ceased making contact with the puck. The subset of the images of the user may be computationally analyzed to recognize a user's gesture as a command to create a user-interface element. The gesture may be a circular motion, two-finger lateral motion, or forward or reverse motion of the user's finger and the user-interface element may be a button, slider bar, or a mouse click, respectively.

In yet another aspect, a system enabling dynamic user interactions with a device having a display screen includes a camera oriented toward a field of view, a source to direct illumination onto the user in the field of view, and a gesture database comprising a series of electronically stored records, each of the records relating a gesture to an input parameter. An image analyzer is coupled to the camera and the database and is configured to capture a plurality of temporally sequential images of the user, computationally analyze a subset of the images of the user to recognize a user's gesture as making contact with a position of an on-screen puck, computationally analyze a further subset of the images of the user to recognize the user's gesture as moving the on-screen puck to a new position, and modify a parameter of a software application in accordance with the new position of the puck.

The puck may be a circle, square, or triangle; the parameter may be a color and sliding the puck may change the color. Recognizing the user's gesture as sliding the on-screen puck may include the gesture crossing a threshold distance before the parameter is modified. The puck may continue to move for a period of time after the user's gesture has ceased making contact with the puck. The puck may spring back to a fixed position after the user's gesture has ceased making contact with the puck. The subset of the images of the user may be computationally analyzed to recognize a user's gesture as a command to create a user-interface element. The gesture may be a circular motion, two-finger lateral motion, or forward or reverse motion of the user's finger and the user-interface element may be a button, slider bar, or a mouse click, respectively.

Reference throughout this specification to "one example," "an example," "one implementation," or "an implementation" means that a particular feature, structure, or characteristic described in connection with the example is included in at least one example of the present technology. Thus, the occurrences of the phrases "in one example," "in an example," "one implementation," or "an implementation" in various places throughout this specification are not necessarily all referring to the same example. Furthermore, the particular features, structures, routines, actions, or characteristics may be combined in any suitable manner in one or more examples of the technology. The headings provided herein are for convenience only and are not intended to limit or interpret the scope or meaning of the claimed technology.

What is claimed is:

1. A method of creating interface elements in a three-dimensional (3D) sensory space, the method including: detecting a first motion made by a finger in a three-dimensional (3D) sensory space using an electronic sensor including capturing the first motion made by the finger and any motions made by other fingers; determining that the first motion by the finger includes a first swirl gesture and determining therefrom any gestures made by individual ones of the other fingers, wherein: the finger making the first motion is a finger that is determined to be moving in a swirling motion; and the finger is attached to a hand that is determined to not move along with the finger that is determined to be moving in the swirling motion; determining, based on magnitudes of theft respective spatial trajectories, whether to recognize a gesture associated with (a) the first motion of the finger and (b) lack of motion of the other fingers of the hand to which the finger is attached; recognizing a gesture associated with the first motion of the finger without motion of the other fingers or the hand to which the finger is attached; constructing an on-screen puck that is constructed having at least one associated function, wherein the on-screen puck is constructed responsive to the first motion made by the finger without motion of the other fingers or the hand to which the finger is attached; detecting using the electronic sensor, a subsequent second motion of both the finger and an extended second finger in the 3D sensory space, wherein: the finger making the first motion and the extended second finger are determined to be moving in second motion; and the subsequent second motion as detected being different from the first motion; determining, based on magnitudes of their respective spatial trajectories, whether to recognize a gesture associated with (a) the second motion of the finger and (b) the extended second finger; recognizing a gesture associated with the second motion of the finger and the extended second finger that is different from the gesture associated with the first motion of the finger and the extended second finger; and rotating the on-screen puck responsive to the subsequent second motion of the finger and the extended second finger moving in the 3D sensory space and performing the at least one associated function.

2. The method of claim 1, further including capturing motion of a hand portion other than the finger.

3. The method of claim 1, further including detecting a repeatedly performed clockwise or anti-clockwise movement of the finger in free space at least substantially concurrent with an upward or downward movement of the finger.

4. The method of claim 1, further including the on-screen puck continuing to move for a period of time after a user ceases making the subsequent second motion of the finger.

5. The method of claim 1, further including the on-screen puck springing back to a fixed position after a user ceases making the subsequent second motion of the finger.

6. A system including one or more processors coupled to memory storing computer instructions to create interface elements in a three-dimensional (3D) sensory space, which computer instructions, when executed on the processors, implement actions comprising: detecting a first motion made by a finger in a three-dimensional (3D) sensory space using an electronic sensor including capturing the first motion made by the finger and any motions made by other fingers; determining that the first motion by the finger includes a first swirl gesture and determining therefrom any gestures made by individual ones of the other fingers, wherein: the finger making the first motion is a finger that is determined to be moving in a swirling motion; and the finger is attached to a hand that is determined to not move along with the finger that is determined to be moving in the swirling motion; determining, based on magnitudes of their respective spatial trajectories, whether to recognize a gesture associated with (a) the first motion of the finger and (b) lack of motion of the other fingers or the hand to which the finger is attached; recognizing a gesture associated with the first motion of the finger without motion of the other fingers or the hand to which the finger is attached; constructing an on-screen puck that is constructed having at least one associated function, wherein the on-screen puck is constructed responsive to the first motion made by the finger without motion of the other fingers or the hand to which the finger is attached; detecting using the electronic sensor, a subsequent second motion of both the finger and an extended second finger in the 3D sensory space, wherein: the finger making the first motion and the extended second finger are determined to be moving in second motion; and the subsequent second motion as detected being different from the first motion; determining, based on magnitudes of their respective spatial trajectories, whether to recognize a gesture associated with (a) the second motion of the finger and (b) the extended second finger; recognizing a gesture associated with the second motion of the finger and the extended second finger that is different from the gesture associated with the first motion of the finger and the extended second finger; and rotating the on-screen puck responsive to the subsequent second motion of the finger and the extended second finger moving in the 3D sensory space and performing the at least one associated function.

7. The system of claim 6, implementing actions comprising capturing motion of a hand portion other than the finger.

8. The system of claim 6, further implementing actions comprising detecting a repeatedly performed clockwise or anti-clockwise movement of the finger in tree space at least substantially concurrent with an upward or downward movement of the finger.

9. The system of claim 6, further implementing actions comprising the on-screen puck continuing to move for a period of time after a user ceases making the subsequent second motion of the finger.

10. The system of claim 6, further implementing actions comprising the on-screen puck springing back to a fixed position after a user ceases making the subsequent second motion of the finger.

11. A non-transitory computer readable storage medium impressed with computer program instructions to create interface elements in a three-dimensional (3D) sensory space, which computer program instructions, when executed on one or more processors, implement actions comprising: detecting a first motion made by a finger in a three-dimensional (3D) sensory space using an electronic sensor including capturing the first motion made by the finger and any motions made by other fingers; determining that the first motion by the finger includes a first swirl gesture and determining therefrom any gestures made by individual ones of the other fingers, wherein: the finger making the first motion is a finger that is determined to be moving in a swirling motion; and the finger is attached to a hand that is determined to not move along with the finger that is determined to be moving in the swirling motion; determining, based on magnitudes of their respective spatial trajectories, whether to recognize a gesture associated with (a) the first motion of the finger and (b) lack of motion of the other fingers or the hand to which the finger is attached; recognizing a gesture associated with the first motion of the finger without motion of the other fingers or the hand to which the finger is attached; constructing an on-screen puck that is constructed having at least one associated function, wherein the on-screen puck is constructed responsive to the first motion made by the finger without motion of the other fingers or the hand to which the finger is attached; detecting using the electronic sensor, a subsequent second motion of both the finger and an extended second finger in the 3D sensory space, wherein: the finger making the first motion and the extended second finger are determined to be moving in second motion; and the subsequent second motion as detected being different from the first motion; determining, based on magnitudes of their respective spatial trajectories, whether to recognize a gesture associated with (a) the second motion of the finger and (b) the extended second finger; recognizing a gesture associated with the second motion of the finger and the extended second finger that is different from the gesture associated with the first motion of the finger and the extended second finger; and rotating the onscreen puck responsive to the subsequent second motion of the finger and the extended second finger moving in the 3D sensory space and performing the at least one associated function.

12. The non-transitory computer readable storage medium of claim 11, further Including instructions that implement capturing motion of a hand portion other than the finger.

13. The non-transitory computer readable storage medium of claim 11, further including instructions that implement detecting a repeatedly performed clockwise or anti-clockwise movement of the finger in free space at least substantially concurrent with an upward or downward movement of the finger.

14. The non-transitory computer readable storage medium of claim 11, further including instructions that implement the on-screen puck continuing to move for a period of time after a user ceases making the subsequent second motion of the finger.

15. The non-transitory computer readable storage medium of claim 11, further including instructions that implement the onscreen puck springing back to a fixed position after a user ceases making the subsequent second motion of the finger.

* * * * *